United States Patent
Alard

(10) Patent No.: US 6,278,686 B1
(45) Date of Patent: Aug. 21, 2001

(54) CONSTRUCTION OF A MULTICARRIER SIGNAL

(75) Inventor: Michel Alard, Paris (FR)

(73) Assignee: France Telecom & Telediffusion de France, Paris (FR)

( * ) Notice: Subject to any disclaimer, the term of this patent is extended or adjusted under 35 U.S.C. 154(b) by 0 days.

(21) Appl. No.: 08/952,331

(22) PCT Filed: Apr. 30, 1996

(86) PCT No.: PCT/FR96/00661

§ 371 Date: Mar. 12, 1998

§ 102(e) Date: Mar. 12, 1998

(87) PCT Pub. No.: WO96/35278

PCT Pub. Date: Nov. 7, 1996

(30) Foreign Application Priority Data

May 2, 1995 (FR) .................................................. 95 05455

(51) Int. Cl.⁷ .............................. H04L 5/06; H04L 27/00
(52) U.S. Cl. .................... 370/204; 370/207; 370/208; 370/478; 375/261
(58) Field of Search ..................................... 370/203, 204, 370/205, 206, 207, 208, 209, 210, 211, 343, 480, 481, 482, 485, 478; 375/239, 260, 261

(56) References Cited

U.S. PATENT DOCUMENTS 5,483,529 * 1/1996 Baggen et al. .................... 370/208
5,550,812 * 8/1996 Philips .............................. 370/208

FOREIGN PATENT DOCUMENTS 0 441 732 A1   8/1991  (EP) .

OTHER PUBLICATIONS

*IEEE Transactions on Information Theory*, "Wavelet–Based Representations for a Class of Self–Similar Signals with Application of Fractal Modulation", Gregory W. Wornell, vol. 38, No. 2, Mar. 1990, pp. 785–800.

*IEEE Transactions on Information Theory*, "The Wavelet Transform, Time–Frequency Localization and Signal Analysis", Ingrid Daubechies, vol. 36, No. 5, Sep. 1990, pp. 961–1005.

Proceedings of the International Conference on Communications, "DMT Systems, DWMT Systems and Digital Filter Banks", Michael A. Tzannes et al., Mar. 1994, pp. 311–315.

1961 Ire International Convention Record, "An Orthogonal Coding Technique for Communications", G.A. Franco and G. Lachs, pp. 126–133.

Proceedings of the Global Telecommunications Conference (Globecom), "Wavelets for Baseband Coding of Waveforms", vol. 1, Nov. 28–Dec. 2, 1994, pp. 363–367.

*The Bell System Technical Journal*, "Synthesis of Band–Limited Orthogonal Signals for Multichannel Data Transmission", vol. 45, Robert W. Chang, Dec. 1966, pp. 1775–1796.

* cited by examiner

Primary Examiner—Ricky Ngo
(74) Attorney, Agent, or Firm—Kinney & Lange, P.A.

(57) ABSTRACT

The invention concerns a multicarrier signal designed to be transmitted to digital receivers, especially in a non-stationary transmission channel, corresponding to the frequency multiplexing of several elementary carriers each corresponding to a series of symbols, two consecutive symbols being separated by a symbol time $\tau_0$, a signal in which, firstly, the spacing $\nu_0$ between two neighboring carriers is equal to half of the reverse of the symbol time $\tau_0$ and, secondly, each carrier undergoes an operation of filtering for the shaping of its spectrum having a bandwidth strictly greater than twice said spacing between carriers $\nu_0$ and is spectrum is chosen so that each symbol element is highly concentrated in the temporal domain and in the frequency domain.

The invention also concerns the methods for the transmission and reception of such a signal.

12 Claims, 24 Drawing Sheets

○ : m even, n even
□ : m even, n odd
⊕ : m odd, n odd
⊠ : m odd, n even

CONSTRUCTION OF A MULTICARRIER SIGNAL

1. FIELD OF THE INVENTION

1.1 General field

The field of the invention is that of the transmission or broadcasting of digital data, or of analog and sampled data, designed to be received in particular by mobile receivers. More specifically, the invention relates to signals produced by means of new forms of modulation as well as the corresponding techniques of modulation and demodulation.

For many years now, it has been sought to build modulation schemes adapted to highly non-stationary channels, such as channels for transmission towards mobile receivers. In such channels, the signal sent out is affected by phenomena of fading and multiple paths. The work carried out by the CCETT within the framework of the European project EUREKA 147 (DAB: Digital Audio Broadcasting) has shown the value, for this type of channel, of multicarrier modulation (MCM) and especially of OFDM (Orthogonal Frequency Division Multiplexing).

OFDM has been chosen within the framework of this European project as the basis of the DAB standard. This technique can also be envisaged as a modulation technique for the broadcasting of television programs. However, it has been observed that there are a certain number of limitations (specified hereinafter) in dealing with the problem of modulation encoded with high spectral efficiency such as the modulation required for digital television applications.

1.2 Possible applications

The invention can be applied in many fields, especially when high spectral efficiency is desired and when the channel is highly non-stationary.

A first category of applications relates to terrestrial digital radio-broadcasting, whether of images, sound and/or data. In particular, the invention can be applied to synchronous broadcasting which intrinsically generates long-term multiple paths. It can also advantageously be applied to broadcasting toward mobile receivers.

Another category of applications relates to digital radio-communications. The invention can be applied especially in systems of digital communications at high bit rates with mobile receivers, in the framework for example of. the UMTS (RACE project). It can also be envisaged for high bit rate local radio networks (of the HIPERLAN type).

A third category of applications is that of underwater transmission. The transmission channel in underwater acoustics is highly disturbed because of the low speed of transmission of acoustic waves in water. This leads to a major spread of the multiple paths and of the Doppler spectrum. The techniques of multicarrier modulation, and especially the techniques that are an object of the present invention, are therefore well suited to this field.

2. PRIOR ART

2.1 Theoretical observations on the representation of the signals

Before presenting the signals according to the invention, a description is given here below of the known signals. This description is based on a general approach to multicarrier signals defined by the inventors. This approach is novel per se. This general approach has indeed no equivalent in the prior art and is no way obvious to those skilled in the art. It must therefore be considered to be a part of the invention and not as forming part of the prior art.

The signals of interest are real signals (an electrical magnitude for example), that have finite energy and are a function of time. The signals may therefore be represented by real functions of $L^2$ (R). Furthermore, these signals are limiteband w signals and their spectrum is contained in $$\left[f_c - \frac{w}{2}, f_c + \frac{w}{2}\right].$$

$f_c$ being the "carrier frequency" of the signal. It is therefore possible, in an equivalent manner, to represent a real signal a(t) by its complex envelope s(t) with:

$$s(t) = e^{-2iw f_c t} F_A[a](t) \quad (1)$$

where $F_A$ designates the analytical filter.

The signal s(t) belongs to a vector subspace $$\left(\text{characterized by the band limitation to } \pm \frac{w}{2}\right)$$

of the space of the complex functions of a real variable with a summable square $L^2$ (R). This vector space can be defined in two different ways, depending on whether the construction is done on the field of the complex values or on the field of the real values. With each of these spaces, it is possible to associate a scalar product that takes values in C or in R to build a Hilbertian space. H designates the Hilbertian space built on the field of the complex values and $H_R$ designates the Hilbertian space built on the field of the real values.

The corresponding scalar values are written as follows:

$$(x \mid y) = \int_R x(t) y^*(t) dt \quad (2)$$

in the case of H and $$(x \mid y)_R = \text{Re} \int_R x(t) y^*(t) dt \quad (3)$$

in the case of $H_R$

The associated standards are obviously identical in both cases:

$$\|x\| = \left[\int_R |x(t)|^2 dt\right]^{1/2} \quad (4)$$

2.2 General principles of the OFDM

The general principles of the OFDM are presented for example in the French patent FR-86 09622 filed on Jul. 2, 1986. The basic idea of the technique is that of transmitting encoded signals as coefficients of elementary waveforms that are confined as far as possible in the time-frequency plane and for which the transmission channel may be considered to be locally stationary. The channel then appears to be a simple multiplier channel characterized by the distribution of the modulus of the coefficients which follows a law of Rice or of Rayleigh.

EProtection is then provided against fading phenomena by means of a code. This code can be used in soft decision mode in association with time and frequency interleaving that ensures that the signals playing a part in the minimum meshing of the code are affected, to the utmost possible extent, by independent fading phenomena.

This technique of encoding with interleaving in the time-frequency plane is known as COFDM. It is described for example in the document [23] (see Appendix 1 (to simplify the reading, most of the prior art references are listed in Appendix 1. This Appendix as well as Appendices 2 and 3 must of course be considered to be integral parts of the present description)).

There are two types of known OFDM modulation. The terms applied in the literature are often ambiguous. Here we introduce new appellations that are more precise while recalling their correspondence with the exiting literature. We shall use the generic name OFDM followed by a suffix specifying the type of modulation within this group.

2.3 OFDM/QAM 2.3.1 Theoretical principles

A first category of modulation is considered to be a multiplex of QAM (Quadrature Amplitude Modulation) modulated carriers or possibly QPSK (Quadrature Phase Shift Keying) modulated carriers in the particular case of binary data elements. Hereinafter, this system shall be called OFDM/QAM. The carriers are all synchronized and the carrier frequencies are spaced out in reverse to the symbol time. Although the spectra of these carriers overlap, the synchronization of the system makes it possible to ensure orthogonality between the symbols sent out by the different carriers.

The references [1] to [7] give a good idea of the literature available on this subject.

For greater simplicity in the writing, and according to the novel approach of the invention, the signals will be represented by their complex envelope described here above. Under these conditions, the general equation of an OFDM/QAM signal is written as follows:

$$s(t) = \sum_{m,n} a_{m,n} x_{m,n}(t) \quad (5)$$

The coefficients $a_{m,n}$ take complex values representing the data sent. The functions $x_{m,n}(t)$ are translated into the time-frequency space of one and the same prototype function $x(t)$:

$$x(t) = \begin{cases} \dfrac{1}{\sqrt{\tau_0}} & \text{if } |t| \le \tau_0 \\ 0 & \text{elsewhere} \end{cases} \quad (6)$$

$$x_{m,n}(t) = e^{i(2\pi n v_0 t + \varphi)} x(t - n\tau_0) \text{ with } v_0 \tau_0 = 1 \quad (7)$$

$\varphi$ being any phase that can be arbitrarily set at 0. The function $x(t)$ is centered, namely its first order moments are zero, giving: $X(f)$ designating the Fourier transform of $x(t)$.

Under these conditions, it is observed that:

$$\int t |x_{m,n}(t)|^2 dt = n\tau_0$$

$$\int f |X_{m,n}(f)|^2 df = m v_0 \quad (9)$$

The barycenters of the basic functions therefore form a lattice of the time-frequency plane generated by the vectors $(\tau_0, 0)$ and $(0, v_0)$, as shown in FIG. 1.

This lattice has a density of one, namely $v_0 \tau_0 = 1$.

Reference may be made to the article [9] for a more detailed discussion on this subject.

The prototype function $x(t)$ has the special characteristic wherein the functions $\{X_{m,n}\}$ are mutually orthogonal and more specifically constitute a Hilbertian base of $L^2(R)$, giving:

$$\langle X_{m,n} | X_{m',n'} \rangle = \begin{cases} 1 & \text{if } (m,n) = (m',n') \\ 0 & \text{if not} \end{cases} \quad (10)$$

Projecting a signal on this basis is equivalent simply to breaking down the signal into sequences with a duration of $\tau_0$ and representing each of these sequences by the corresponding Fourier series development. This type of breakdown is a first step towards a localization both in time and in frequency as opposed to the standard Fourier analysis which provides for perfect frequency localization with a total loss of temporal information.

Unfortunately, while the temporal localization is excellent, the frequency localization is far less efficient owing to the slow decreasing function of X(f). The Balian-Low-Coifman-Semmes theorem (see [9], p. 976) furthermore shows that if X designates the Fourier transform of x, then tx(t) and fX(f) cannot simultaneously be summable squares.

2.3.2 The OFDM/QAM with guard interval

Generally, the tolerance of an OFDM modulation with respect to multiple paths and Doppler spreading can be characterized by a parameter that comprehensively measures the variation of the level of intersymbol interference (II) as a function of a temporal or frequency shift. The justification of this concept is given in Appendix 2. This tolerance parameter is called $\xi$ and is defined by the relationship:

$$\xi = \tfrac{1}{4}\pi \Delta t \Delta f \quad (11)$$

with:

$$\Delta t^2 \int |x(t)|^2 dt = \int t^2 |x(t)|^2 dt \quad (12)$$

$$\Delta f^2 \int |X(f)|^2 df = \int f^2 |X(f)|^2 df \quad (13)$$

By virtue of Heisenberg's inequality, $\xi$ cannot exceed unity.

Given the Balian-Low-Coifman-Semmes theorem referred to here above, the parameter $\xi$ is equal to 0 for the OFDM/QAM. This is a major defect of the OFDM/QAM modulation as described here above. This is characterized in practice by high sensitivity to temporal errors and consequently multiple paths. This defect can be circumvented by the use of a guard interval described for example in [5]. This is a device consisting in extending the rectangular window of the prototype function. The density of the lattice of base symbols is then strictly smaller than unity.

This technique is possible because an infinity of translated versions of the initial symbol is found within a symbol extended by a guard interval. Of course, this works only because the prototype function is a rectangular window. In this sense, the OFDM/QAM with a guard interval is a unique and singular point.

OFDM/QAM modulation with guard interval is the basis of the DAB system. This guard interval makes it possible to limit inter-symbol interference at the cost of a loss of performance since a part of the information transmitted is not really used by the receiver but is used only to absorb the multiple paths.

Thus, in the case of the DAB system, where the guard interval represents 25% of the useful symbol, the loss is 1 dB. Furthermore, there is an additional loss due to the fact that to obtain a given comprehensive spectral efficiency, it is necessary to compensate for the loss due to the guard interval by a greater efficiency-of the code used.

This loss is marginal in the case of the DAB system because the spectral efficiency is low. On the contrary, if it is sought to obtain an overall spectral eefficiency of 4 bits/Hz, it is necessary to use a 5 bit/Hz code giving, according to the Shannon theorem, a loss of the order of 3 dB. The total loss is therefore in this case about 4 dB.

2.3.3 Other OFDM/QAM systems

It is possible to conceive of other systems of the OFDM/QAM type. Unfortunately, no filtered QAM modulation, namely one using a conventional half-Nyquist (or more specifically "Nyquist square root") type of shaping verifies the requisite constraints of orthogonality. The known prototype functions verifying the requisite criteria of orthogonality are:

the rectangular window;
the cardinal sine.

These two examples are trivial and appear to be dual with respect to each other by the Fourier transform. The case of the rectangular window corresponds to the OFDM/QAM without guard interval. The case of the cardinal sine corresponds to a standard frequency multiplex (namely one where the carriers have disjoint spectra) with a 0% roll-off which is an asymptotic case that is difficult to achieve in practice.

In each of these cases, it is observed that the prototype function is perfectly limited either in time or in frequency but has a poor decay (in 1/t or 1/f) in the dual domain.

The Balian-Low-Coifman-Semmes theorem furthermore leaves little hope that there might exist satisfactory solutions. As indicated here above, this theorem shows that tx(t) and fX(f) cannot simultaneously have a summable square. They can therefore be no hope of finding a function x(t) such that x(t) and X(f) decrease simultaneously with an exponent smaller than $-3/2$.

This furthermore does not rule out the possible existence of functions that are satisfactory from the viewpoint of an engineer. However, a recent article [10] dealing with this subject shows another exemplary prototype function having the requisite properties. The shape of the prototype function proposed in this article is very far from what may be hoped for in terms of temporal concentration. It is therefore probable that there is no satisfactory OFDM/QAM type solution.

In conclusion, the OFDM/QAM approach corresponding to the use of a lattice with a density 1 and complex coefficients $a_{m,n}$ can be put into practice only in the case of a rectangular temporal window and in the case of the use of a guard interval. Those skilled in the art seeking other modulations will therefore have to turn towards the techniques described here below under the designation of OFDM/OQAM.

2.4 OFDM/OOAM

A second category of modulations uses a multiplex of OQAM (Offset Quadrature Amplitude Modulation) modulated carriers. Hereinafter, this system shall be called OFDM/OQAM. The carriers are all synchronized and the carrier frequencies are spaced out by half of the reverse of the symbol time. Although the spectra of these carriers overlap, the synchronization of the system and the choices of the phases of the carriers can be used to guarantee the orthogonality between the symbols put out by the different carriers. The references [11–18] give a clear picture of the literature available on this subject.

For greater simplicity in the writing, the signals are represented in their analytical form. Under these conditions, the general equation of an OFDM/OQAM signal be written as follows:

$$s(t) = \sum_{m,n} a_{m,n} x_{m,n}(t) \tag{14}$$

The coefficients $a_{m,n}$ assume real values representing the data elements transmitted. The functions $x_{m,n}(t)$ are translated in the time-frequency space of one and the same prototype function $x(t)$:

$$\begin{cases} x_{m,n}(t) = e^{i(2\pi n v_0 t + \varphi)} x(t - n\tau_0) & \text{if } m+n \text{ is even} \\ x_{m,n}(t) = i e^{i(2\pi m v_0 t + \varphi)} x(t - n\tau_0) & \text{if } m+n \text{ is odd} \end{cases} \tag{15}$$

with $v_0 \tau_0 = \frac{1}{2}$.

$\varphi$ being any phase that can be arbitrarily set at 0.

The barycenters of the basic functions therefore form a lattice of the time-frequency plane generated by the vectors $(\tau_0, 0)$ and $(0, v_0)$, as shown in FIG. 2.

This lattice has a density 2. The functions $x_{m,n}(t)$ are mutually orthogonal with respect to the scalar product in R. In the known approaches, the prototype function is limited in frequency in such a way that the spectrum of each carrier overlaps only that of the adjacent carriers. In practice, the prototype functions considered are even-order functions (real or possibly complex) verifying the following relationship:

$$\begin{cases} X(f) = 0 & \text{if } |f| \geq v_0 \\ (X(f))^2 + |X(f - v_0)|^2 = 1/v_0 & \text{if } 0 \leq f \leq v_0 \end{cases} \tag{16}$$

A possible choice for $x(t)$ is the pulse response of half-Nyquist filter with 100% roll-off, namely:

$$x(f) = \begin{cases} \dfrac{1}{\sqrt{v_0}} \cos \pi f \tau_0 & \text{if } |f| \leq v_0 \\ 0 & \text{elsewhere} \end{cases} \tag{17}$$

When $x(t)$ and its Fourier transform are observed, it is noted that $X(f)$ has a bounded support and that $x(t)$ decreases in $t^{-2}$, i.e. this is a result substantially better than the theoretical limit resulting from the Balian-Low-Coifman-Semmes theorem. The elementary waveforms are better localized in the time-frequency plane than in the case of the OFDM/QAM, which gives this modulation a better behavior in the presence of multiple paths and of Doppler phenomena. As above, it is possible to define the parameter t measuring the tolerance of the modulation to the delay and to the Doppler phenomenon. This parameter $\xi$ is equal to 0.865.

3. DRAWBACKS OF THE PRIOR ART SYSTEM

These known systems have many drawbacks and limits, especially in very disturbed channels and when high efficiency is required.

3.1 OFDM/QAM

The main problem of the OFDM/QAM system is that it imperatively requires the use of a guard interval. As indicated here above, this gives rise to a substantial loss of efficiency when high spectral efficiency values are aimed at.

Furthermore, the signals sent out are poorly concentrated in the frequency domain, which also limits the performance characteristics in the highly non-stationary channels. In particular, this spread makes it difficult to use equalizers.

3.2 OFDM/OQAM

Conversely, the frequency performance characteristics of the OFDM/OQAM are rather satisfactory and the problem of the loss related to the guard interval does not arise. By contrast, the pulse response of the prototype function has a relatively slow temporal decrease, namely a decrease in $1/x^2$.

This implies two types of difficulties. First of all, it is difficult to truncate the waveform in a short interval of time. This implies complex processing in the receiver. Furthermore, this also implies possible systems of equalization.

In other words, the efficiency of the OFDM/OQAM techniques is greater than that of the OFDM/QAM techniques, but these techniques prove to be more complicated to implement and therefore costly, especially in receivers.

4. PRESENTATION OF THE INVENTION

4.1 Goals of the invention

It is an aim of the invention in particular to overcome these different drawbacks and limitations of the prior art.

Thus, an aim of the invention is to provide a digital signal designed to be transmitted or broadcast to receivers, that can be used to obtain better performance characteristics in non-stationary channels and especially in highly non-stationary channels.

The invention is also aimed at providing a signal of this kind that can be used to obtain high spectral efficiency.

Another aim of the invention is to provide a signal of this kind that avoids the drawbacks of the OFDM/QAM approach related to the guard interval while at the same time preserving a temporal response of the prototype function that is as concentrated as possible, in particular so as to simplify the processing at the receiver.

The invention is also aimed at providing a signal of this kind enabling the making of receivers with limited complexity and cost, especially as regards demodulation and equalization.

An additional goal of the invention is to provide transmitters, receivers, methods of transmission or broadcasting, methods of reception and methods for the construction, namely the definition, of a modulation corresponding to such a signal.

4.2 Main characteristics of the invention

These aims as well as others that shall appear hereinafter are achieved according to the invention by a multicarrier signal designed to be transmitted to digital receivers, especially in a non-stationary transmission channel, corresponding to the frequency multiplexing of several elementary carriers each corresponding to a series of symbols, two consecutive symbols being separated by a symbol time $\tau_0$, a signal in which firstly the spacing $v_0$ between two neighboring carriers is equal to half of the reverse of the symbol time $\tau_0$, and in which secondly each carrier undergoes an operation of filtering for the shaping of its spectrum having a bandwidth strictly greater than twice said spacing between carriers $v_0$. This spectrum is chosen so that each symbol element is concentrated as far as possible both in the temporal field and the frequency field.

In particular, a signal of this kind may correspond to the following equation:

$$s(t) = \sum_{m,n} a_{m,n} x_{m,n}(t)$$

where:

$a_{m,n}$ is a real coefficient representing the signal source chosen in a predetermined alphabet of modulation;

m is an integer representing the frequency dimension;

n is an integer representing the temporal dimension;

t represents time;

$x_{m,n}(t)$ is a basic function translated into the time-frequency space of one and the same even-order prototype function x(t) taking real or complex values, namely:

$$x_{m,n}(t) = \pm i^{m+n} e^{i(2\pi m v_0 t + \phi)} x(t - n\tau_0) \text{ with } v_0 \tau_0 = \frac{1}{2}$$

where $\phi$ is an arbitrary phase parameter, the Fourier transform X(f) of the function x(t) having a support extending beyond the interval $[-v_0, v_0]$, and where said basic functions $\{x_{m,n}\}$ are mutually orthogonal, the real part of the scalar product of two different basic functions being zero.

The symbol "±" indicates that $x_{m,n}(t)$ may, without distinction, take a negative sign or a positive sign. It does not of course mean that $x_{m,n}(t)$ takes both values.

Thus, the invention is based on a system of modulation that uses prototype functions that are as concentrated as possible in the time-frequency plane. The value of this approach is that of having available a modulation producing a signal that avoids the drawbacks of the OFDM/QAM related to the guard interval while at the same time preserving a temporal response of the prototype function that is as concentrated as possible so as to simplify the processing at the receiver.

In other words, an object of the invention relates to novel systems of modulation built, like the OFDM/OQAM modulation, on an orthogonal lattice with a density 2 without the prototype function thereby in any way being a function with a frequency-bounded support. Among the types of modulation proposed, there are either modulations using prototype functions with time-bounded supports or prototype functions that are not bounded either in time or in frequency but on the contrary have properties of fast decrease both in time and in frequency and an almost optimum concentration in the time-frequency plane.

Signals of this kind are in no way obvious to those skilled in the art, in view of the prior art. As indicated here above, there are basically two modes of construction of OFDM type modulations.

The first known mode of construction uses a lattice with a density 1. This first approach uses a base for the breaking down of the signals where every signal is subdivided into intervals, each interval being then broken down in the form of a Fourier series. This is the OFDM/QAM approach. The literature gives few examples of alternative approaches built on the same lattice, and the results obtained are of little practical interest [10].

Furthermore, the OFDM/QAM technique is the only one that can benefit from the method of the guard interval. The OFDM/QAM approach is therefore a singular feature that permits no extension.

The second known mode of construction (OFDM/OQAM) uses a lattice with the density 2. The orthogonality between symbols centered on one and the same frequency or on adjacent frequencies is ensured by a shaping of the half-Nyquist signals and by an appropriate choice of the phase of the signal. Finally, the orthogonality beyond the adjacent frequencies is ensured by the fact that the frequency bands do not overlap.

Consequently, it is not obviously easy to build new modulations that do not verify this property.

All the variants of the invention described here below have the advantage of using a prototype function either limited in the temporal domain or having a fast decrease so that the function can be easily truncated.

According to a first variant, said prototype function x(t) is an even-order function that is zero outside the interval $[\tau_0, \tau_0]$, and verifies the relationship:

$$\begin{cases} x(t) = 0 & \text{if } |t| \geq \tau_0 \\ |x(t)|^2 + |x(t-\tau_0)|^2 = 1/\tau_0 & \text{if } 0 \leq t < \tau_0 \end{cases}$$

Advantageously, said prototype function x(t) is difined by:

$$x(t) = \begin{cases} \frac{1}{\sqrt{\tau_0}} \cos \pi t / 2\tau_0 & \text{if } |t| \leq \tau_0 \\ 0 & \text{elsewhere} \end{cases}$$

In the first case (hereinafter called OFDM/MSK), the performance characteristics in terms of resistance to the Doppler phenomenon and to the multiple paths are equivalent to the OFDM/OQAM modulation, and the making of the receiver is simplified.

According to a second variant of the invention, said prototype function x(t) is characterized by the equation:

$$x(t) = \frac{y(t)}{\sqrt{\tau_0 \sum_k |y(t-k\tau_0)|^2}}$$

the function y(t) being defined by its Fourier transform Y(f):

$$Y(f) = \frac{G(f)}{\sqrt{v_0 \sum_k |G(f-kv_0)|^2}}$$

where G(f) is a normalized Gaussian function of the type: $G(f) = (2a)^{1/4} e^{-v_0 f^2}$ α being a strictly positive real parameter, k varying from $-\infty$ to $+\infty$.

Advantageously, the parameter α is equal to unity.

The corresponding modulation is hereinafter called OFDM/IOTA. In this case, the corresponding prototype function referenced $\Im$ is identical to the Fourier transform.

The making of the receiver is simpler than in the case of the OFDM/OQAM, although sightly more complex than in the previous case, but the performance characteristics are substantially higher.

The invention also relates to a method for the transmission of a digital signal especially in a non-stationary transmission channel, comprising the following steps:

the channel encoding of a digital signal to be transmitted, delivering real digital coefficients $a_{m,n}$ chosen out of a predetermined alphabet;

the construction of a signal s(t) meeting the equation defined here above;

the transmission of a signal, having said signal s(t) as its complex envelope, to at least one receiver.

Advantageously, a method of this kind furthermore comprises a step of frequency and/or time interleaving applied to the binary elements forming said digital signal to be transmitted or to the digital coefficients $a_{m,n}$.

This makes it possible to provide for optimal performance characteristics in the non-stationary channels.

The invention also relates to the transmitters of a signal of this kind.

The invention also relates to a method for the reception of a signal as described here above, comprising the following steps:

the reception of a signal having, as its complex envelope, a signal r(t) corresponding to the signal s(t) at transmission;

the estimation of the response of the transmission channel comprising an estimation of the phase response $\theta_{m,n}$ and of the amplitude response $\rho_{m,n}$;

the demodulation of said signal r(t) comprising the following steps:

the multiplication of said signal r(t) by the prototype function x(t);

the aliasing of the filtered waveform modulo $2\tau_0$; ;

the application of a Fourier transform (FFT);

the correction of the phase $\theta_{m,n}$ induced by the transmission channel;

the correction of the phase corresponding to the term $i^{m+n}$;

the selection of the real part of the coefficient obtained $\tilde{a}_{m,n}$ corresponding to the coefficient $a_{m,n}$ transmitted weighted by the amplitude response $\rho_{m,n}$ of the transmission channel.

Preferably, this reception method comprises a step for the frequency and/or time de-interleaving of said real digital coefficients $\tilde{a}_{m,n}$ and, possibly, of the corresponding values $\rho_{m,n}$ of the amplitude response of the channel, said de-interleaving being the reverse of an interleaving implemented at transmission and/or a step pf weighted-decision decoding that is adapted to the channel encoding implemented at transmission.

The invention also relates to the corresponding receivers.

Finally, the invention also relates to a preferred method for the construction of a prototype function x(t) for a signal as described here above comprising the following steps:

the selection of a normalized Gaussian function G(f) of the type:

$$G(f) = 2a\alpha)^{1/4} e^{-\pi \alpha f^2};$$

the determining of said prototype function x(t) such that:

$$x(t) = \frac{y(t)}{\sqrt{\tau_0 \sum_k |y(t-k\tau_0)|^2}}$$

the function y(t) being defined by its Fourier transform Y(f):

$$Y(f) = \frac{G(f)}{\sqrt{v_0 \sum_k |G(f-kv_0)|^2}}.$$

This method makes it possible in particular to define the prototype function $\mathfrak{J}$, described here above.

5. DESCRIPTION OF PARTICULAR EMBODIMENTS OF THE INVENTION

5.1. List of Figures

Figure 1:
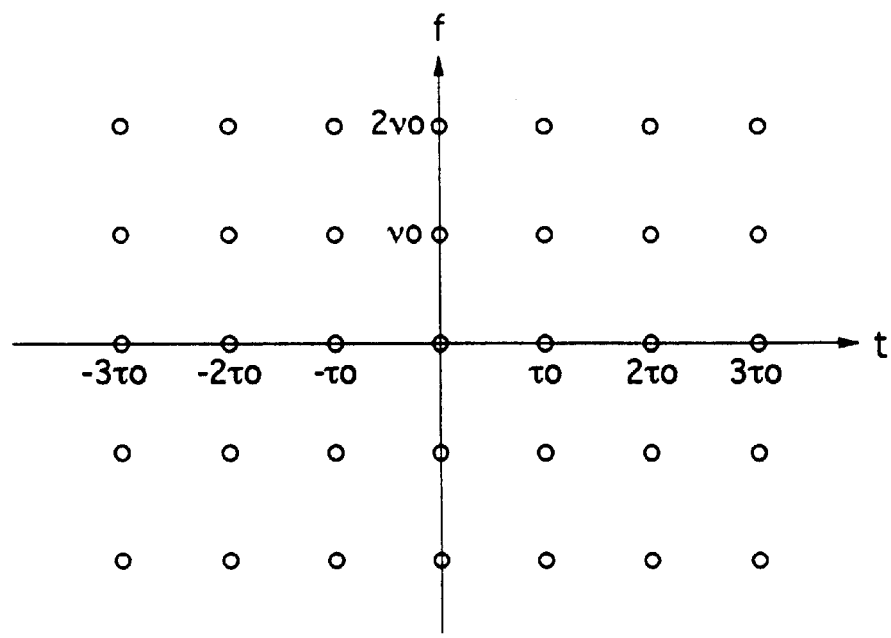
FIG. 1 illustrates a lattice with a density 1, corresponding to the one implemented in the case of the known OFDM/QAM modulation.
Figure 7A:
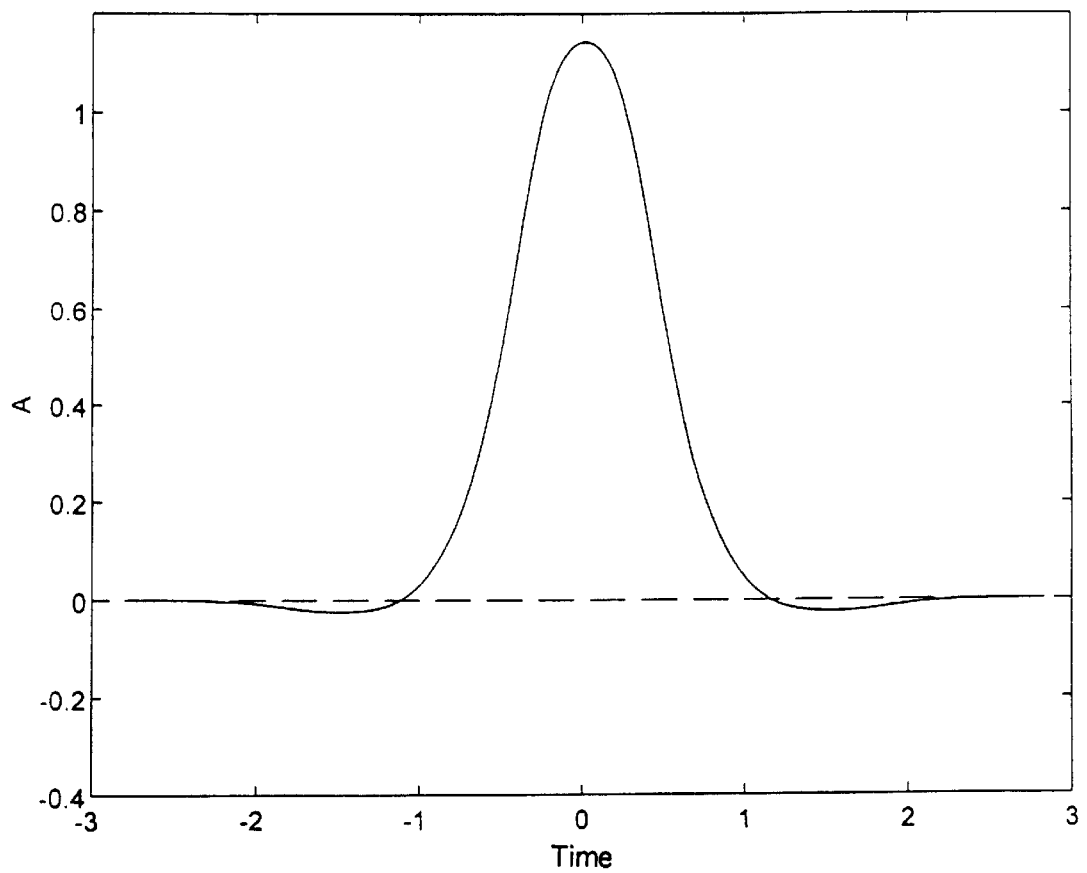
Figure 7B:
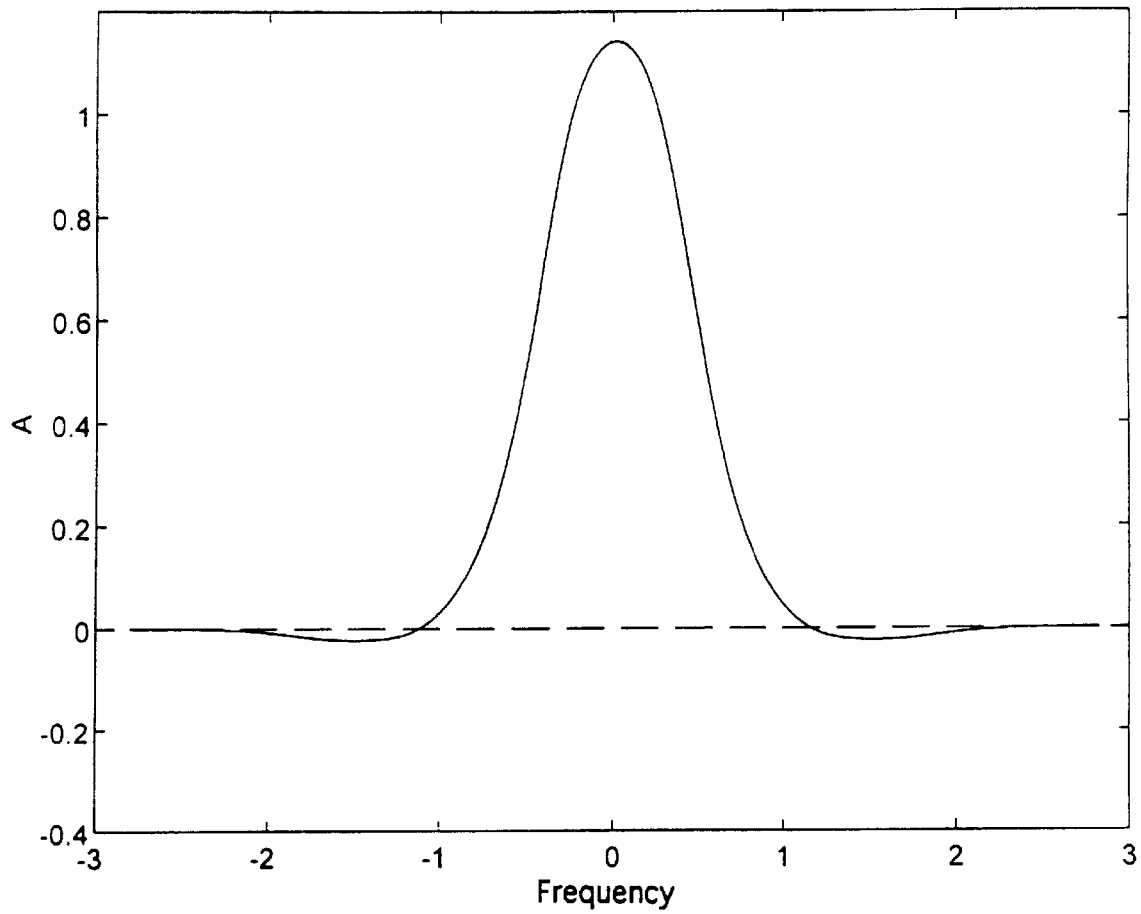
Figure 7C:
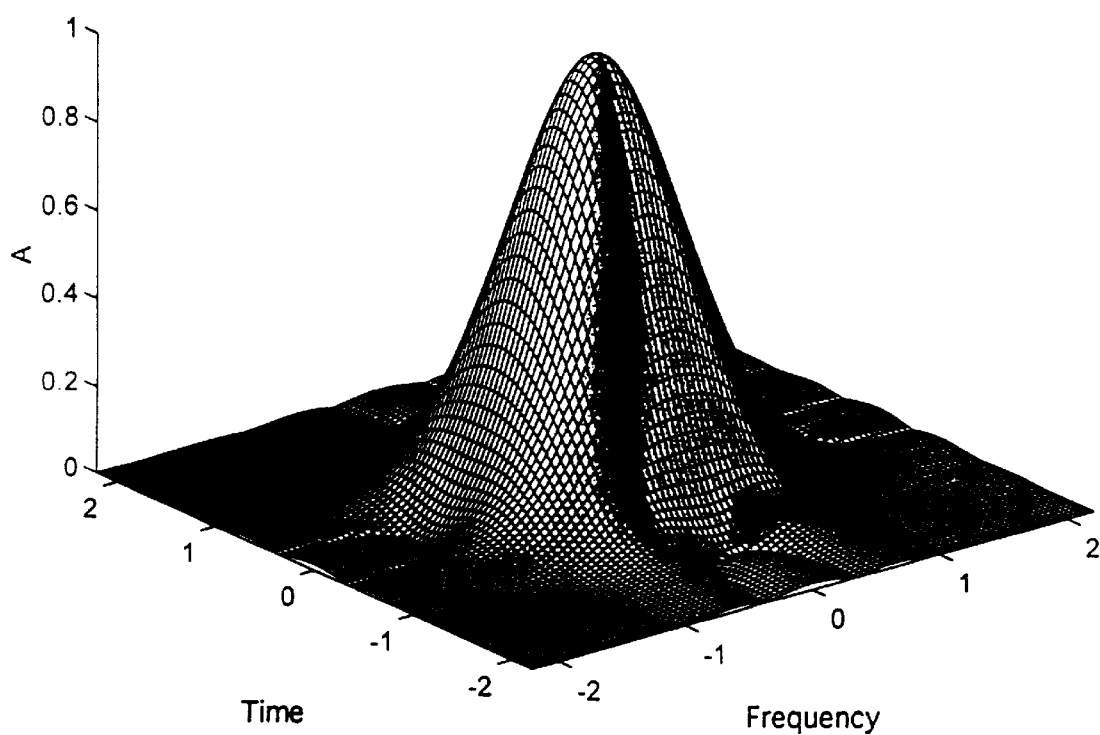
Figure 7D:
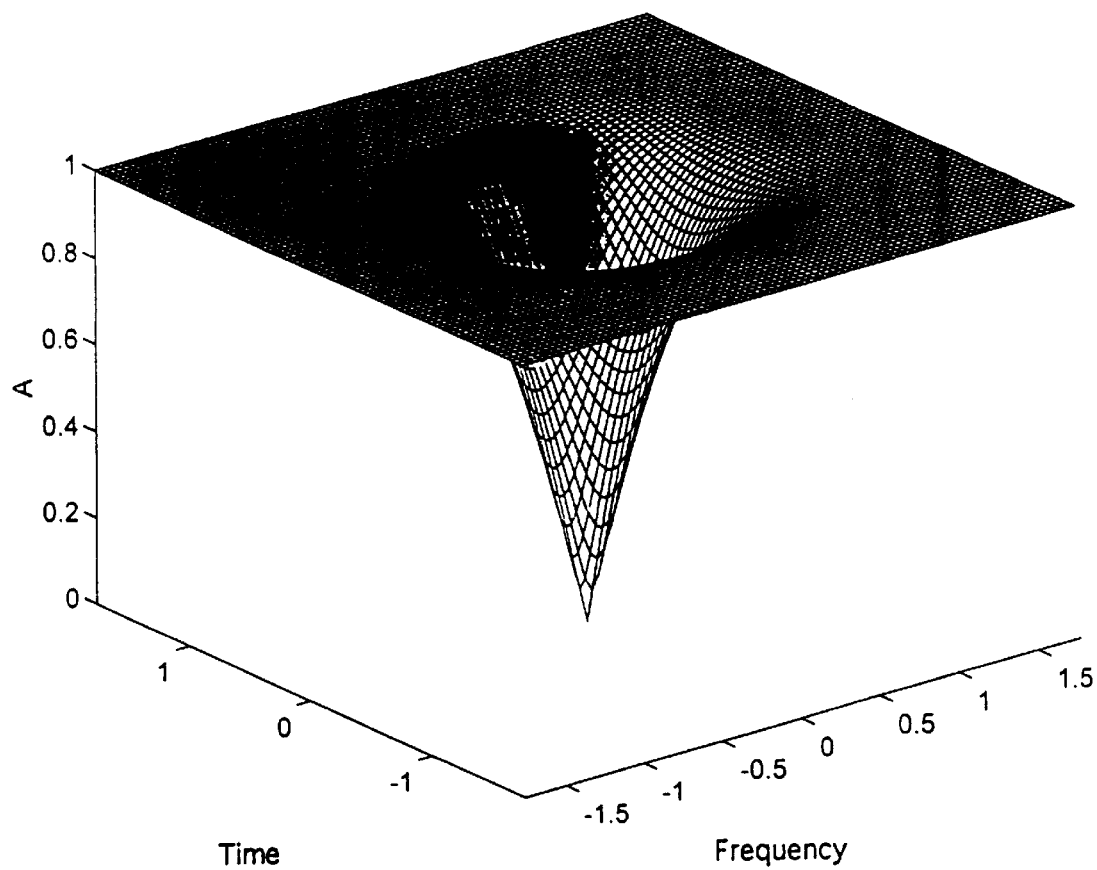
Figure 7E:
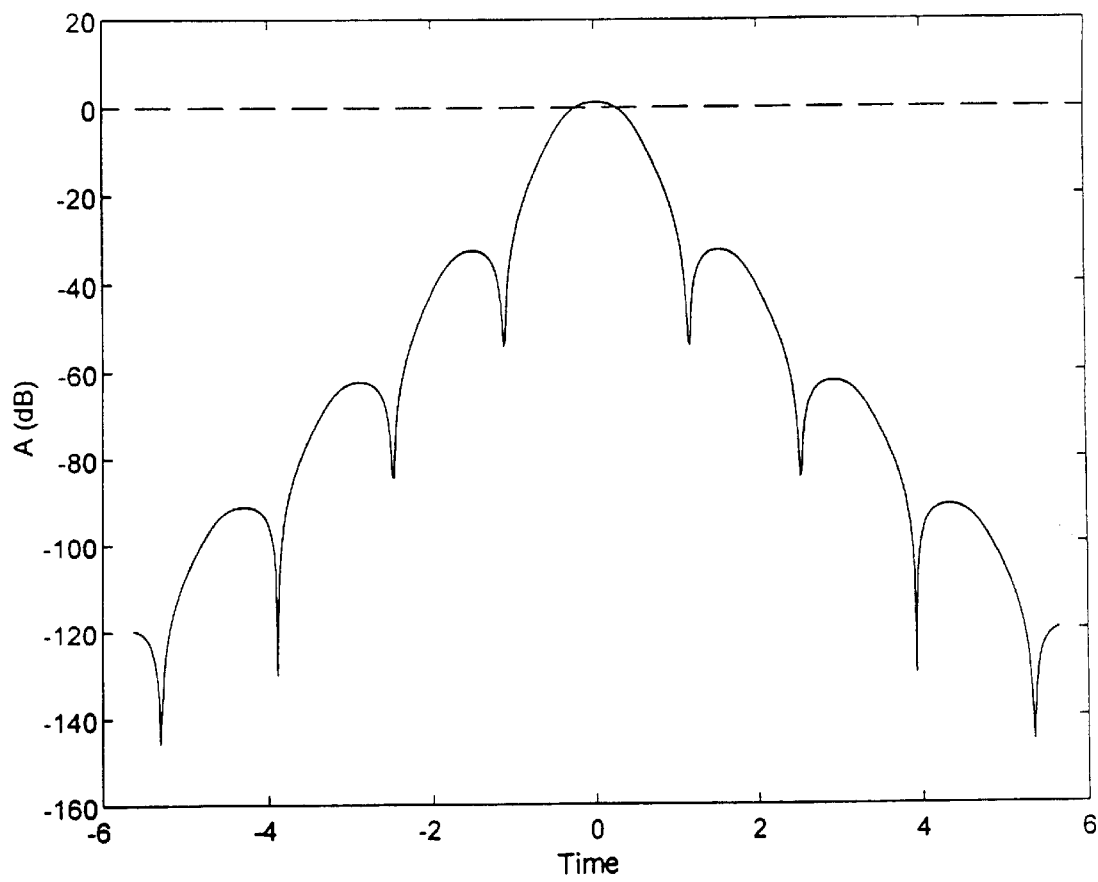
Figure 8:
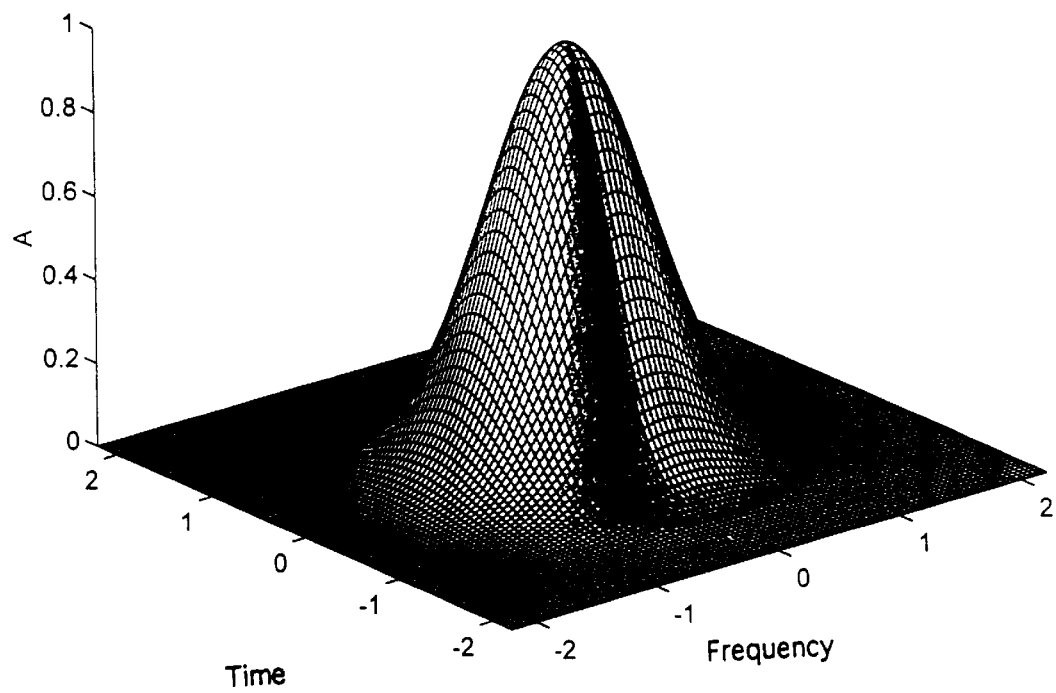
Figure 9:
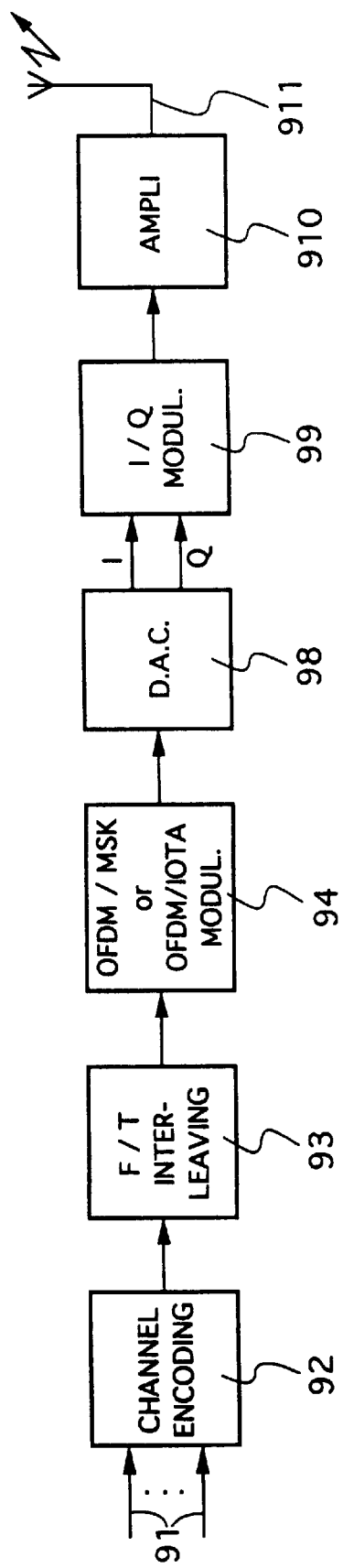
Figure 10:
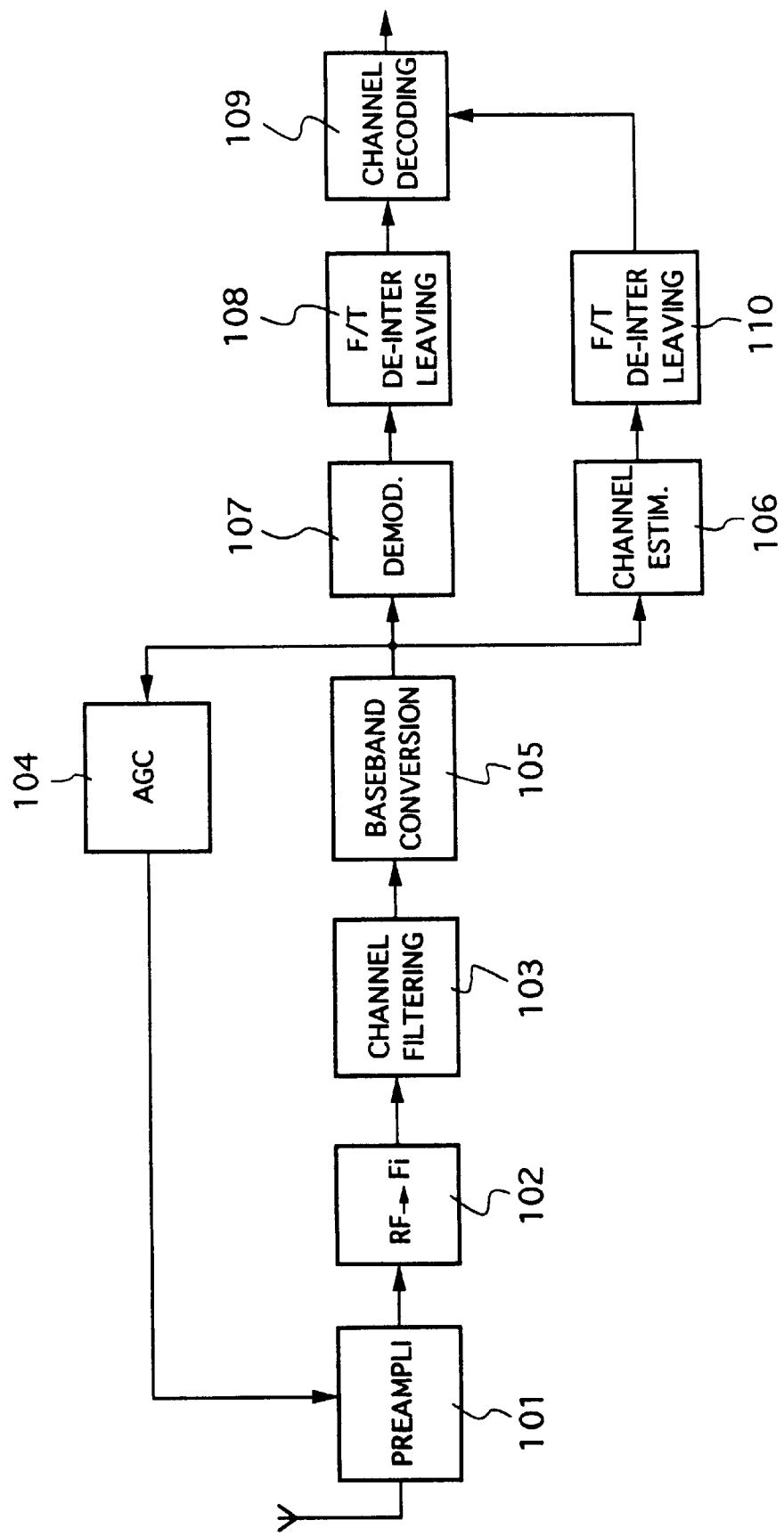
Figure 11:
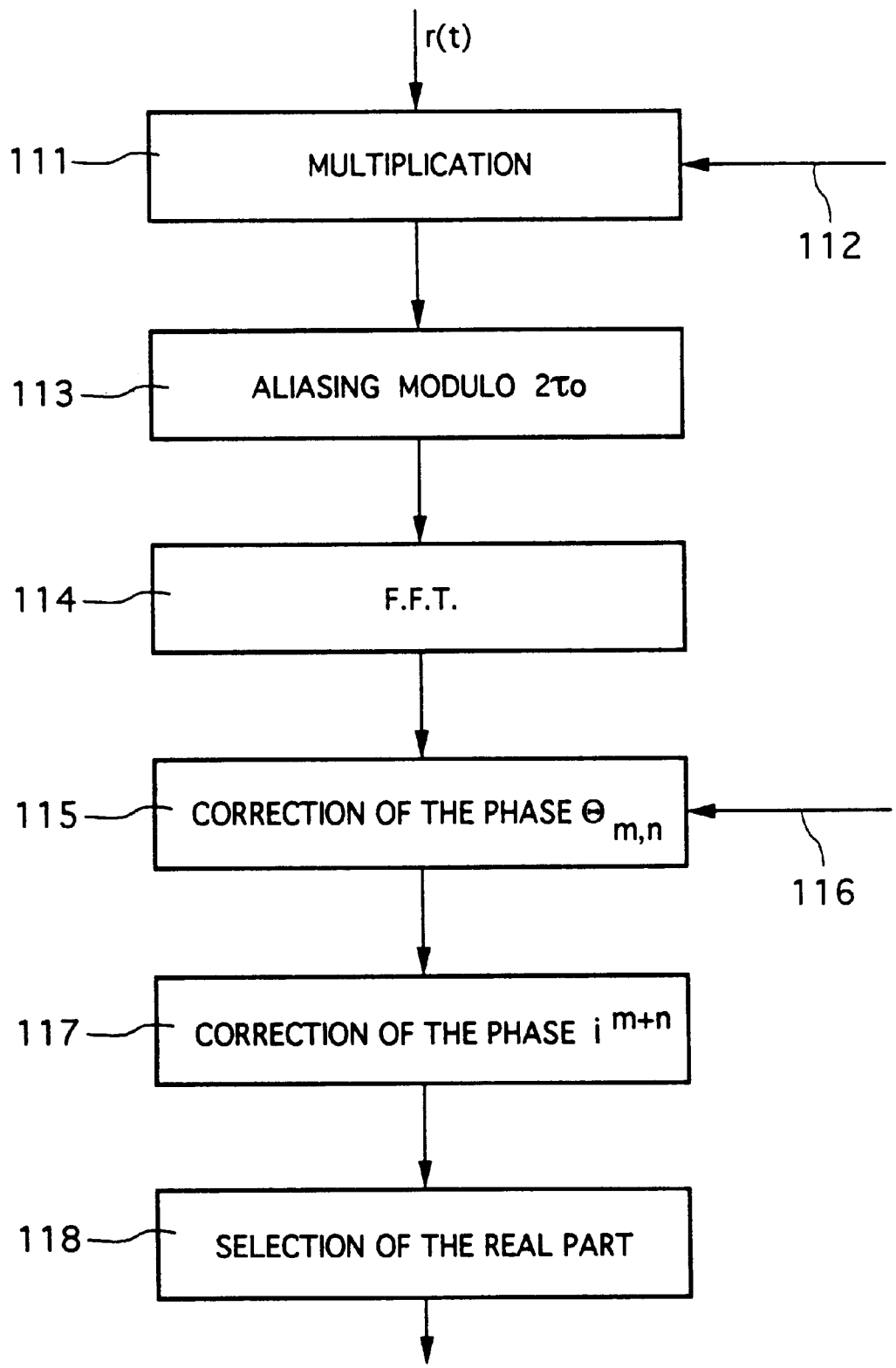

FIGS. 3A to 3D, 4C to 4D, 5A to 5D, 6A to 6D and 7A to 7D respectively show the known OFDM/QAM modulation (3), OFDM/QAM modulation with guard interval (4), OFDM/OQAM modulation (5) and the types of modulation used in the invention namely OFDM/MSK modulation (6) and OFDM/IOTA modulation (7), according to the following aspects:

A: the prototype function x(t);
B: the linear Fourier transform of the prototype function;
C: the modulus of the linear ambiguity function (as defined in Appendix 2);
D: the intersymbol function (as defined in Appendix 2);

FIG. 7E shows the decrease of the signal OFDM/IOTA in logarithmic scale;

FIG. 8 shows the ambiguity function of a Gaussian function;

FIG. 9 is a block diagram of a transmitter (and of a corresponding transmission method) that can be used according to the invention;

FIG. 10 is a block diagram of a receiver (and to the corresponding reception method) that can be used according to the invention;

FIG. 11 gives a more precise view of the method of the modulation implemented in the receiver of FIG. 10.

5.2. Main Theories of the Signals according to the Invention

All the basic signals of the OFDM/OQAM defined in (15) can be rewritten in the following form:

$$x_{m,n}(t) = \pm i^{m+n} e^{i(2\pi m\ v_0 t + \phi)} x(t - n\tau_0) \text{ with } v_0 \tau_0 = \frac{1}{2} \quad (18)$$

Figure 2:
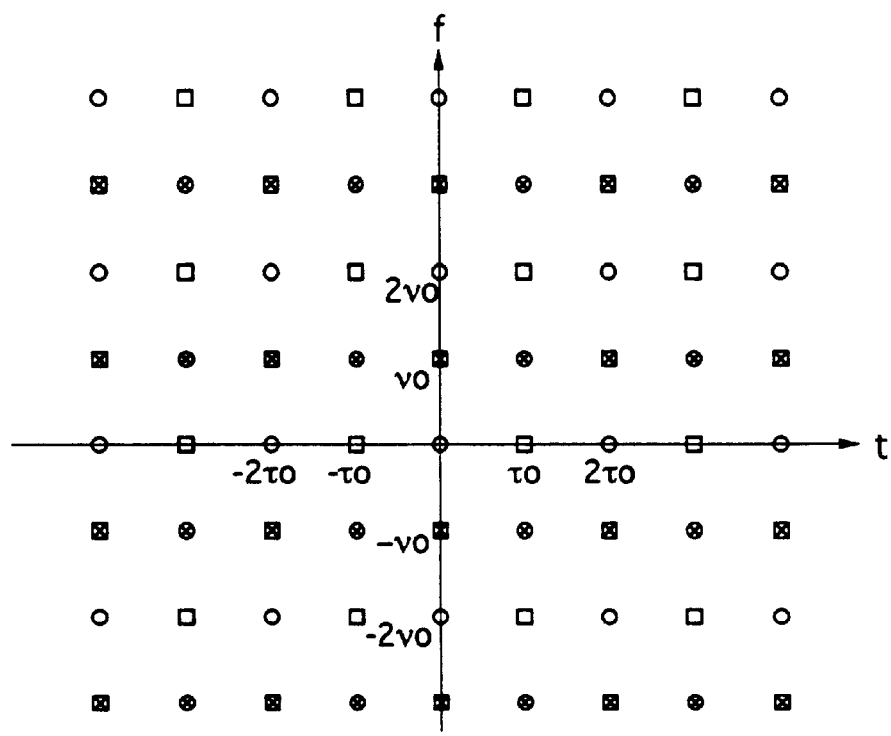
FIG. 2 illustrates a lattice with a density 2, corresponding to the one implemented in the case of the known OFDM/OQAM modulation, and in the case of the invention.

The barycenters of the basic functions therefore form a lattice of the time-frequency plane generated by the vectors $(\tau_0, 0)$ and $(0, v_0)$ (see FIG. 2). This lattice has a density of 2, namely $v_0 \tau_0 = \frac{1}{2}$. As indicated. in [16], these functions constitute a Hilbertian basis of $H_R$. In order to simplify the writing, we shall hereinafter omit the sign reversals.

In general, it is sought to have conditions on x(t) so that the group $\{x_{m,n}\}$ constitutes a Hilbertian basis of $H_R$. It is laid down that x(t) should be an even-order function. The scalar product of $x_{m,n}$ and of $X_{m',n'}$ can be written a follows:

$$(x_{m,n}|x_{m',n'})_R = \Re e \int i^{(m-m')+(n-n')} e^{2i\pi(m-m')v_0 t} x(t - n\tau_0) x^*(t - n'\tau_0) dt \quad (19)$$

namely, by assuming $t' = t - (n+n')\tau_0/2$ and $\tau'_0 = (n-n')\tau_0$:

$$(x_{m,n}|x_{m',n'})_R = \Re e [\int i^{(m-m')+(n-n')} e^{2i\pi(m-m')(n+n')v_0\tau_0/2} e^{2i\pi(m-m')v_0 t'} x(t'-\tau'_0/2) x^*(t'+\tau'_0/2 dt'] \quad (20)$$

$\Re e[\int i^{(m-m')+(n-n')} i^{(m-m')(n+n')} \int (\text{even-order function+odd-order function})]$ The orthogonality is therefore obtained if the coefficient of the integral is a pure imaginary number. The analysis of this coefficient shows that it is enough for this purpose for m−m' or for n−n' to be an odd number.

The lattice can therefore be split up into four sub-lattices, as can be seen in FIG. 2 ({m even number, n even number}, {m even number, n odd number}, {m odd number n even number}, {m odd number, n odd number}) which are mutually orthogonal (any function of one of the sub-lattices is orthogonal to any function of another sub-lattice). A sufficient condition in order that $\{x_{m,n}\}$ may constitute a Hilbertian basis is therefore that:

$$(x_{m,n}|X_{m',m'})_R = 0 \,\forall m-m' \text{even}, \,\forall n-n' \text{even}, (m,n) \neq (m',n') \quad (21)$$

It is therefore enough to find an even-parity function x(t) such that the functions of the type:

$$x_{2m,2n}(t) = e^{4i\pi m v_0 t} x(t - 2n\tau_0) \quad (22)$$

are mutually orthogonal with respect to the scalar product in R. Furthermore, if such is the case, these functions are also orthogonal with respect to the scalar product in C, for reasons of symmetry similar to those referred to here above. Another way of expressing this condition is to use the function of ambiguity of x [19]:

$$A_x(\tau, v) = \int x(t+\tau/2) x^*(t-\tau/2) e^{-2i\pi v t} dt \quad (23)$$

It is then enough to find an even order function x(t) such that:

$$A_x(2n\tau_0, 2m v_0) = 0, \,\forall (m,n) \neq (0,0) \quad (24)$$

If the problem thus raised is compared to that of finding a Hilbertian basis with respect to the scalar product in C, the constraints of orthogonality are substantially lower since the lattice concerned is half as dense. Indeed, the basic functions are centered on the points of the lattice $\{2mv_0 2n\tau_0\}$, namely a lattice with a density of ½. The reasons for the inapplicability of the Balian-Low-Coifman-Semmes theorem therefore can be seen here in an intuitively evident manner.

In the case of the OFDM/OQAM approach, the orthogonality of the functions $x_{2m,2n}(t)$ with respect to one another is obtained by two constraints of different natures. Indeed, if $m \neq m'$, $(x_{2m,2n}|x_{2m',2n'})$ is zero because these functions have disjoint spectra. Furthermore, $(x_{2m,2n}|x_{2m,2n'})$ is zero because X(f) has a half-Nyquist type shaping.

As can be seen in the abundant literature already referred to, those skilled in the art consider it imperative to verify these two constraints. In particular, they are of the view that the prototype function must be one with a frequency-bounded support.

5.3. General principles of the invention

The invention is based on a wholly novel approach to the multicarrier signals of the OFDM/OQAM type. According to this novel approach orthogonality is obtained no longer by respect for the two constraints mentioned here above but by a specific definition of the prototype functions.

In other words, an object of the invention is new signals based on systems of modulation built like the OFDM/OQAM modulation on an orthogonal lattice with a density of 2 without this implying that the prototype function is in any way one with a frequency-bounded support.

The principle used is that of building orthogonal lattices with a density ½ and then deducing therefrom lattices with a density of 2 by a judicious choice of the phases of the signals.

Very many signals may be constructed according to the technique of the invention. Two non-restricted examples of such signals are given here below, respectively called OFDM/MSK and OFDM/IOTA. A particular method for building such signals is also given by way of a non-exhaustive example in Appendix 3. This method of course forms part of the invention and has been put in an appendix only to simplify the reading of the present description.

5.4. OFDM/MSK modulation

Here we consider a new modulation built according to the same generic equation as the OFDM/OQAM modulation (equations 14 and 15), but using a different prototype function. It shall be called OFDM/MSK because each carrier is MSK modulated [20]. The prototype function is written as follows:

$$x(t) = \begin{cases} \frac{1}{v_0}\cos\pi\tau_0 & \text{if } |t| \le \tau_0 \\ 0 & \text{elsewhere} \end{cases} \quad (25)$$

In fact, it is observed on an a posteriori basis that this modulation can be considered as being dual with respect to the OFDM/OQAM because it corresponds to an exchange of the time and frequency axes. The essential value of this modulation with respect to the OFDM/OQAM is that the prototype function is strictly limited in time. This particularly simplifies the implementation of the receiver since the number of coefficients of the input filter is considerably reduced. Furthermore, the performance characteristics in the presence of multiple paths are unchanged, the parameter x being identical.

5.5. The IOTA modulation

The OFDM/IOTA modulation on the contrary results from a totally novel and original approach to the field of signal processing that we have named the IOTA (Isotropic Orthogonal Transform Algorithm) transform, described in Appendix 3.

5.5.1. Equation of the signal

Here we shall consider a new modulation built according to the same generic equation as the OFDM/OQAM modulation (equations 14 and 15), but on the basis of a different prototype function. It shall be named OFDM/IOTA owing to the choice of the prototype function. The prototype function is written as follows:

$$x(t) = \frac{1}{2^{1/4}\sqrt{\tau_0}}\mathfrak{I}(t/\tau_0\sqrt{2}) \quad (26)$$

$\mathfrak{I}$ designing the function IOTA defined in Appendix 3.

It will be noted that the building method given in Appendix 3 can be used to obtain an infinity of solutions, the function IOTA constituting a remarkable solution. The basic functions of the OFDM/IOTA modulation are therefore written as follows:

$$\mathcal{J}_{m,n}(t) = \frac{i^{m+n}}{2^{1/4}\sqrt{\tau_0}}e^{2i\pi n v_0 \tau}\mathcal{J}\left(\left(\frac{t}{\tau_0}-n\right)/\sqrt{2}\right) \quad (27)$$

with $v_0\tau_0 = 1/2$

The transmitted signal can therefore be written as follows:

$$s(t) = \sum_{m,n} a_{m,n}\mathcal{J}_{m,n}(t) \quad (28)$$

with:

$$a_{m,n} = \mathfrak{Re}\int s(t)\mathfrak{I}_{m,n}(t)dt \quad (29)$$

5.5.2. Comments on the figures and advantages related to rapid decrease

In order to highlight the advantages of the invention in a visual manner, the following are presented for each modulation discussed here above:

A: the prototype function x(t);
B: the linear Fourier transform linearly of the prototype function;
C: the modulus of the linear ambiguity function (as described in Appendix 2);
D: the intersymbol function (as defined in Appendix 2).

The views shown of the ambiguity function (figures referenced C) enable the judgement of the confinement of the prototype function in the time-frequency plane. The views shown of the intersymbol function (figures referenced D) enable an appreciation of the sensitivity of a modulation to delay and to the Doppler phenomenon. The phase errors are not considered since all the modulations are equivalent in this respect.

FIGS. 3A to 3D relate to the known case of the conventional OFDM/QAM modulation. The main defect of this modulation is not, as might be suggested by the frequency. response of the prototype function, the slow decrease of the level of the minor lobes.

Indeed, the sensitivity of the OFDM to the frequency errors is only slightly greater than that of the other types of considered. By contrast, the II has a different set of statistical values expressed by a horizontal closing of the eye equivalent to that of a modulation with a zero roll-off. There therefore exist traces, which are admittedly improbable but could create systematic errors when there is no coding. This detail is an unesthetic one but is of no real consequence in the presence of coding. By contrast, this slow decrease means that the II energy is distributed over a large number of neighboring symbols, which makes any attempt at equalization difficult.

Paradoxically, the real problem comes from the sudden truncation of the temporal response which corresponds to an ambiguity function that is triangular along this axis. This gives an intersymbol function with very high sensitivity to the temporal errors: the slope is vertical and the parameter ξ is therefore zero. This is what warrants the use of a guard interval.

Figure 3A:
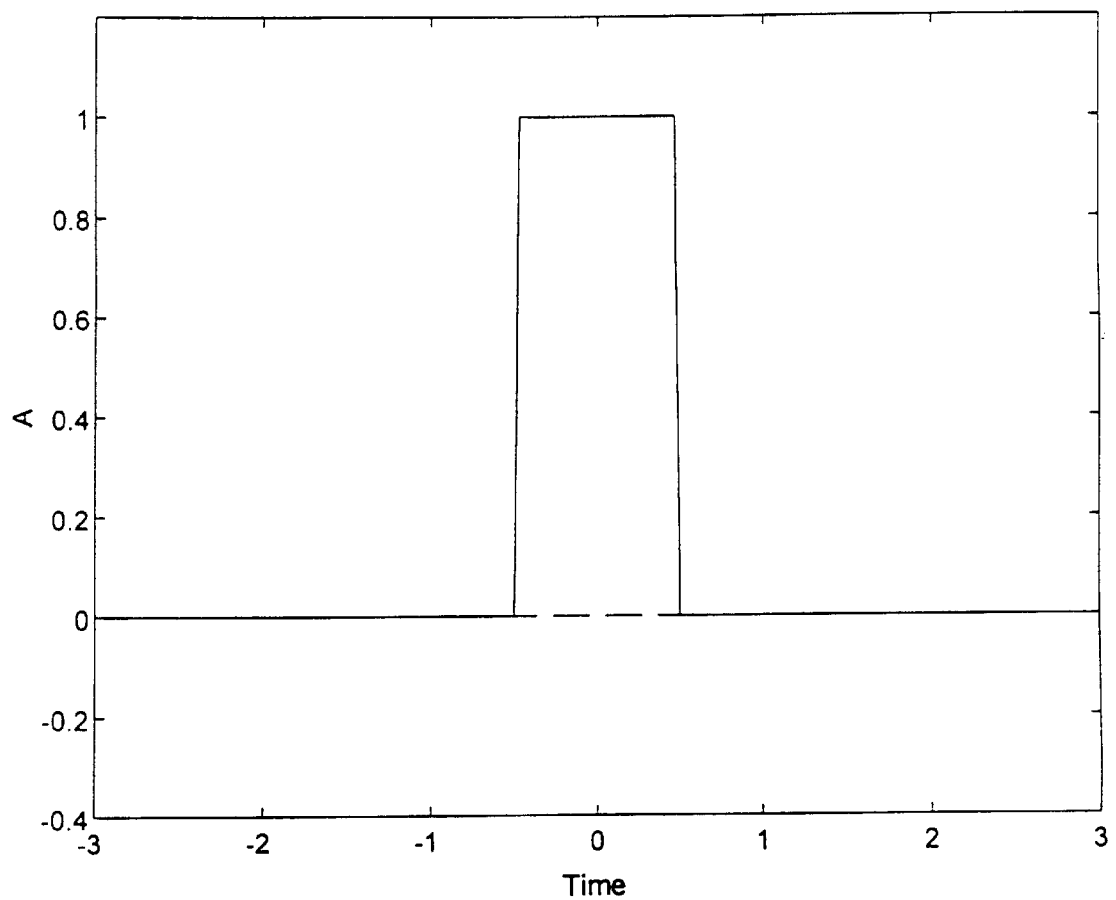
Figure 3B:
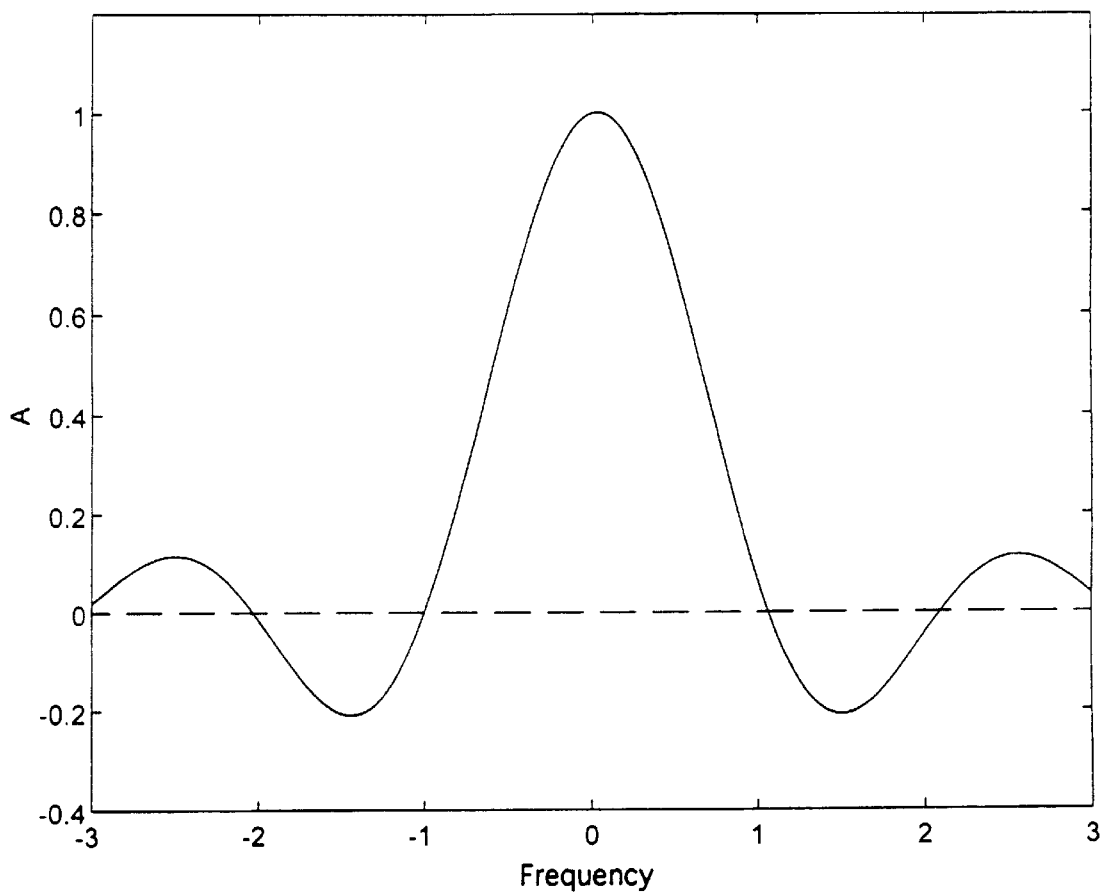
Figure 3C:
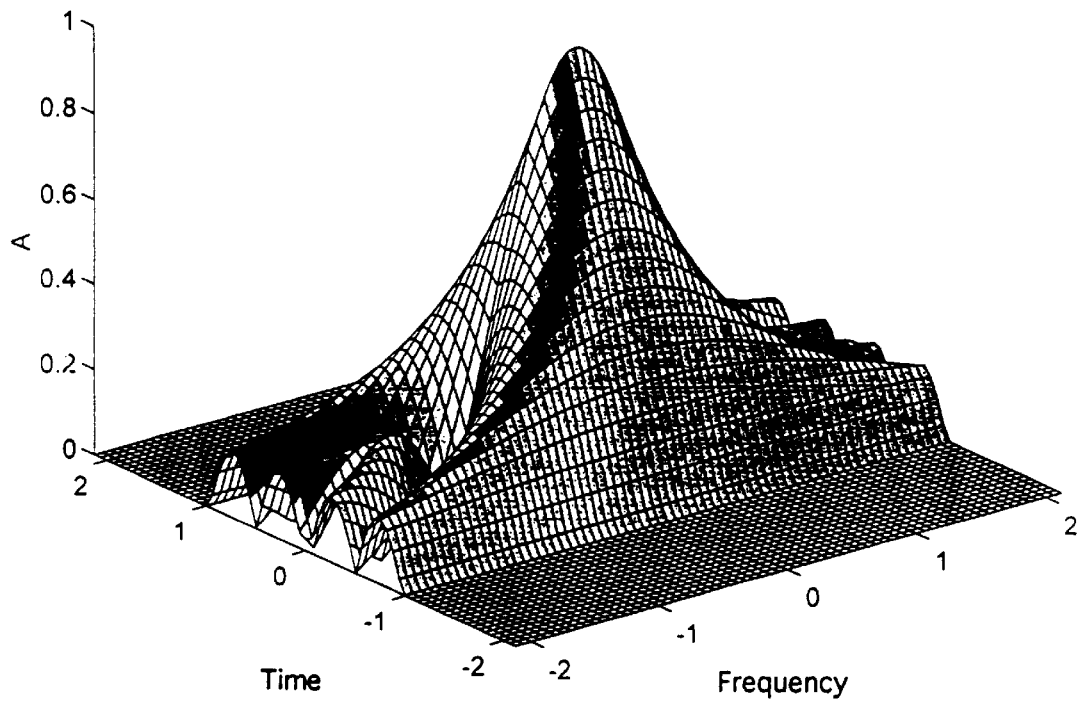
Figure 3D:
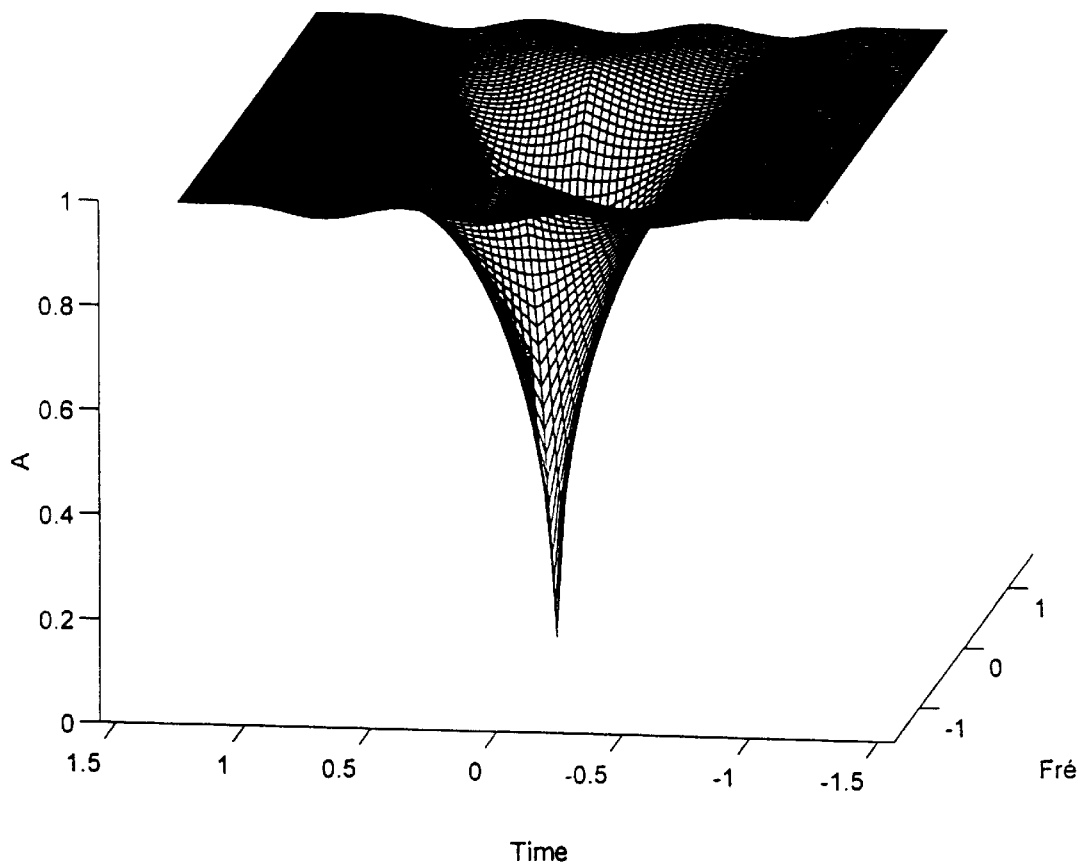
Figure 4C:
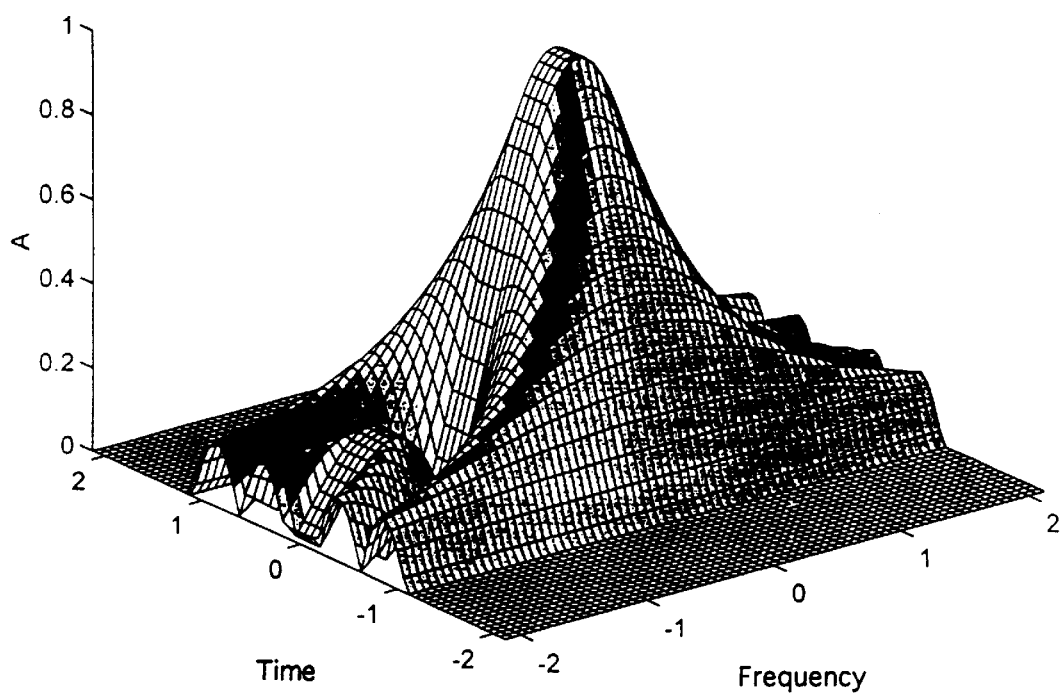
Figure 4D:
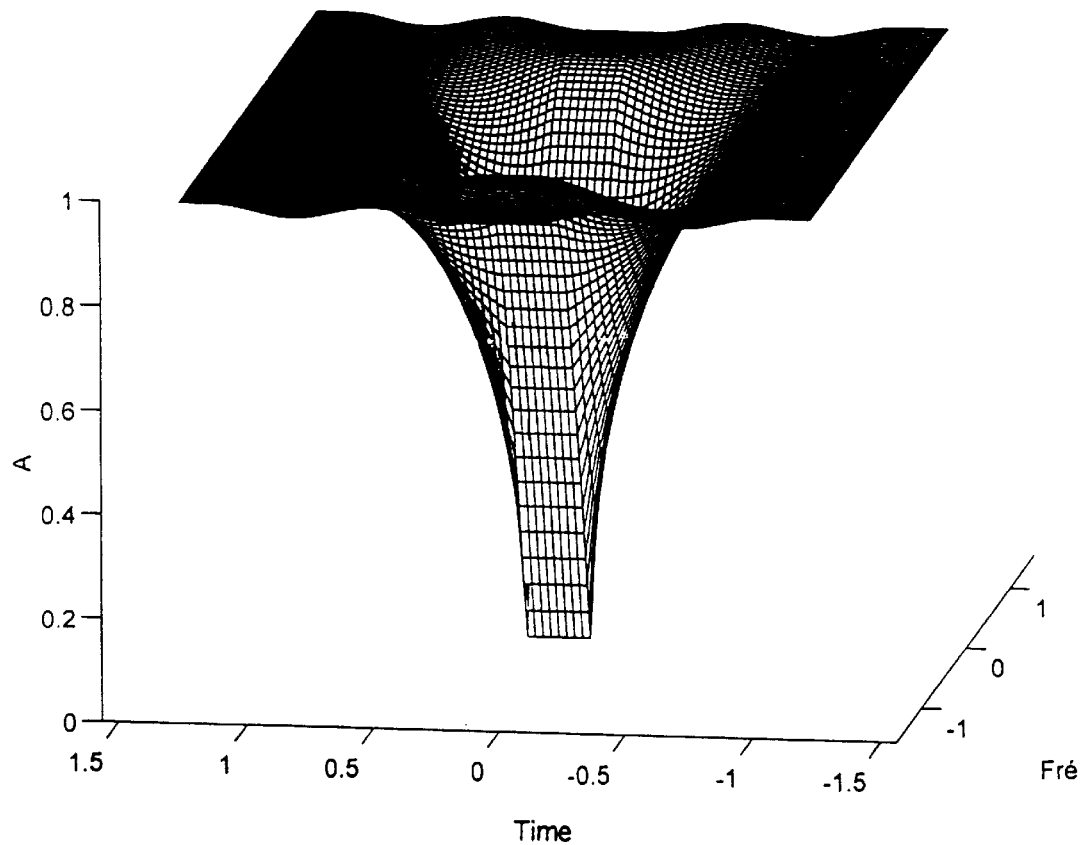
Figure 5A:
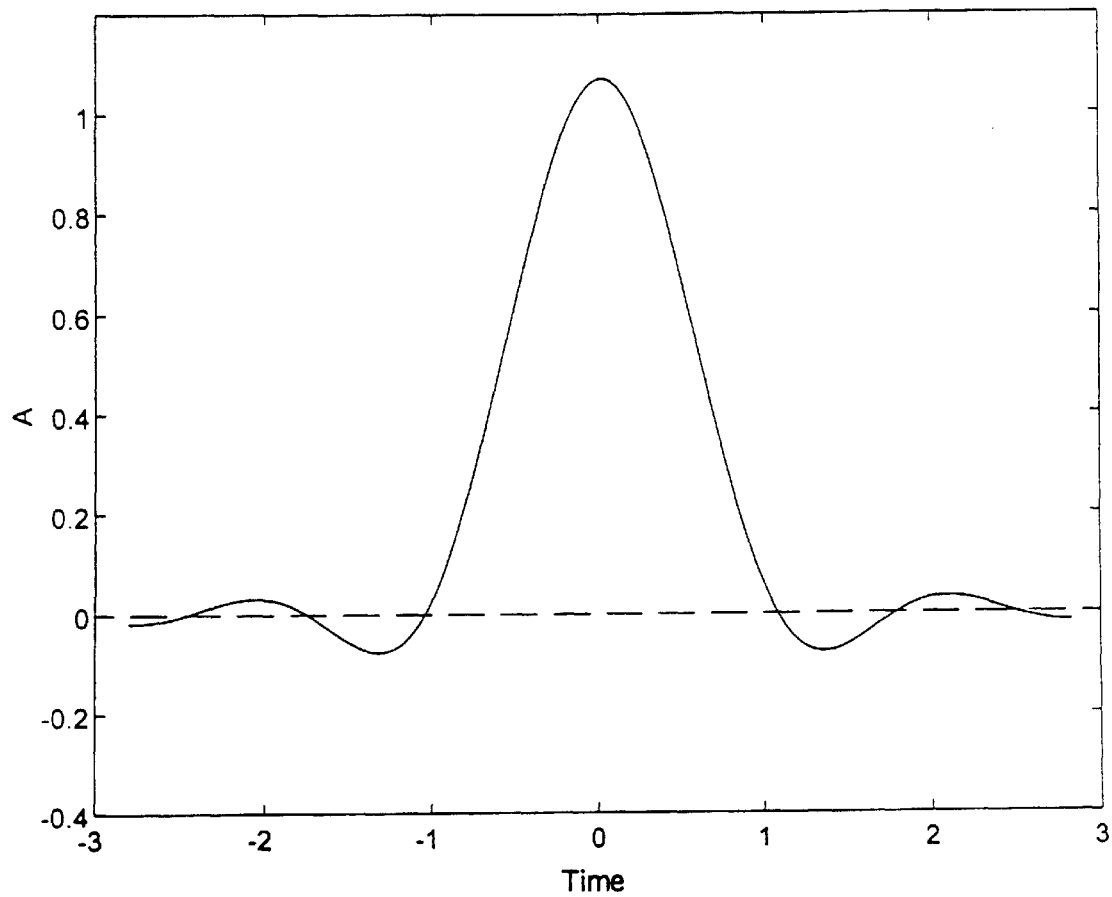
Figure 5B:
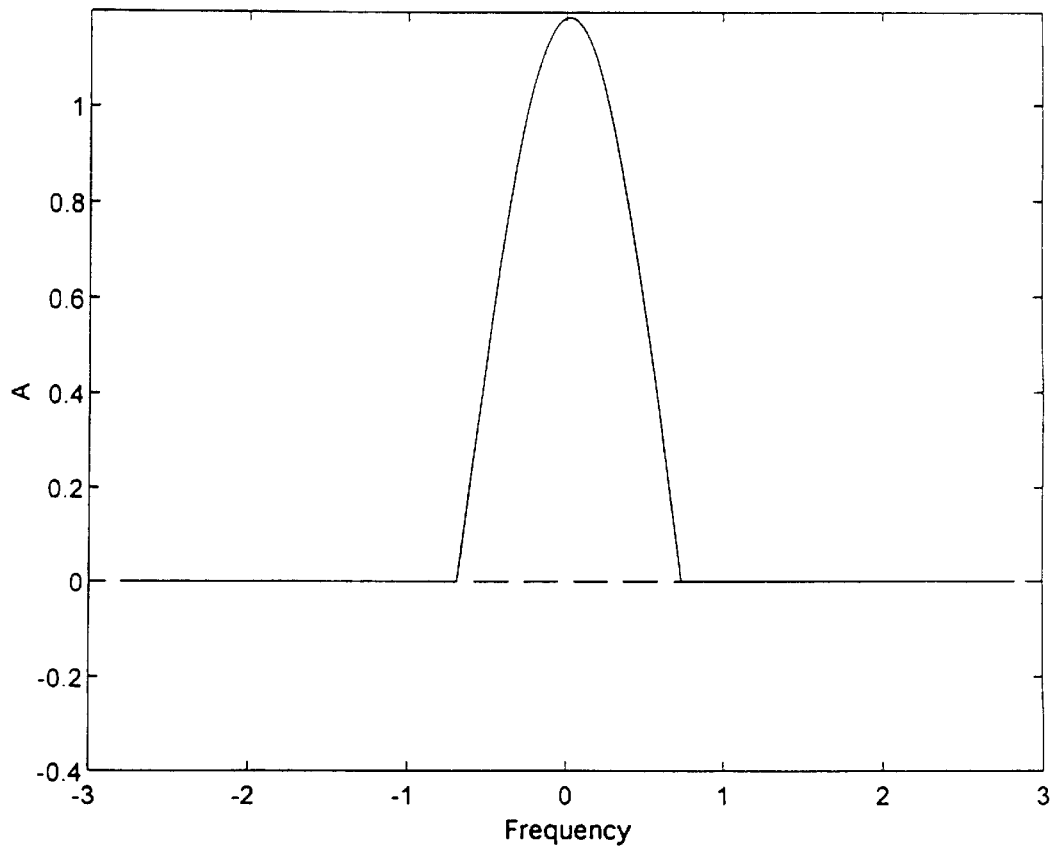
Figure 5C:
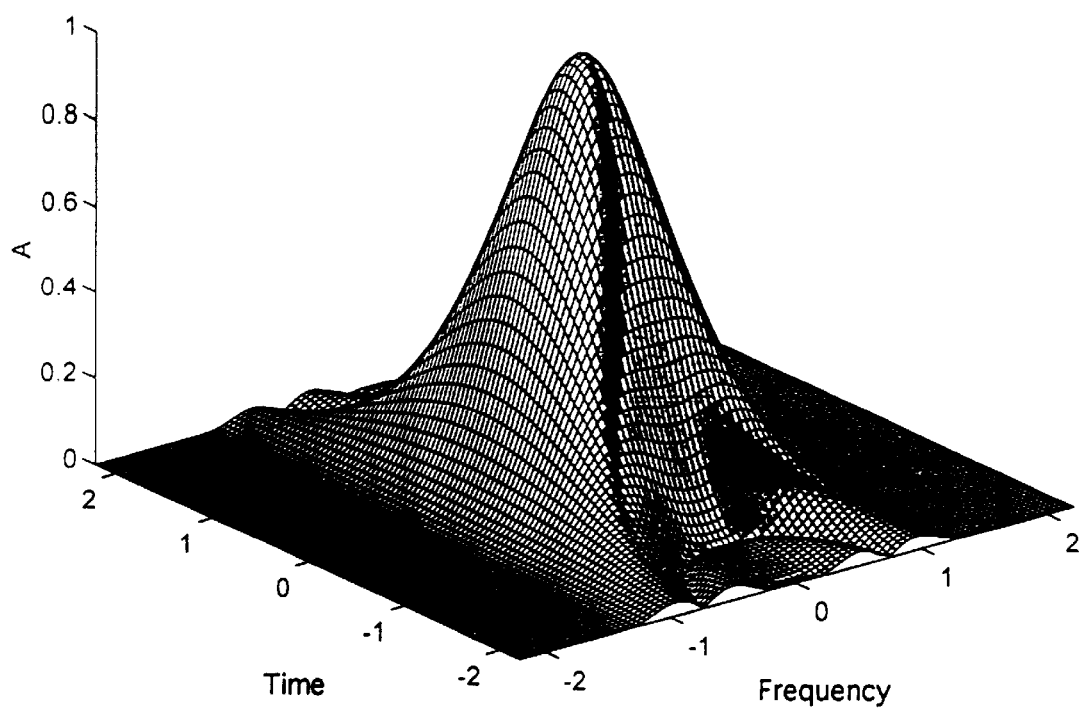
Figure 5D:
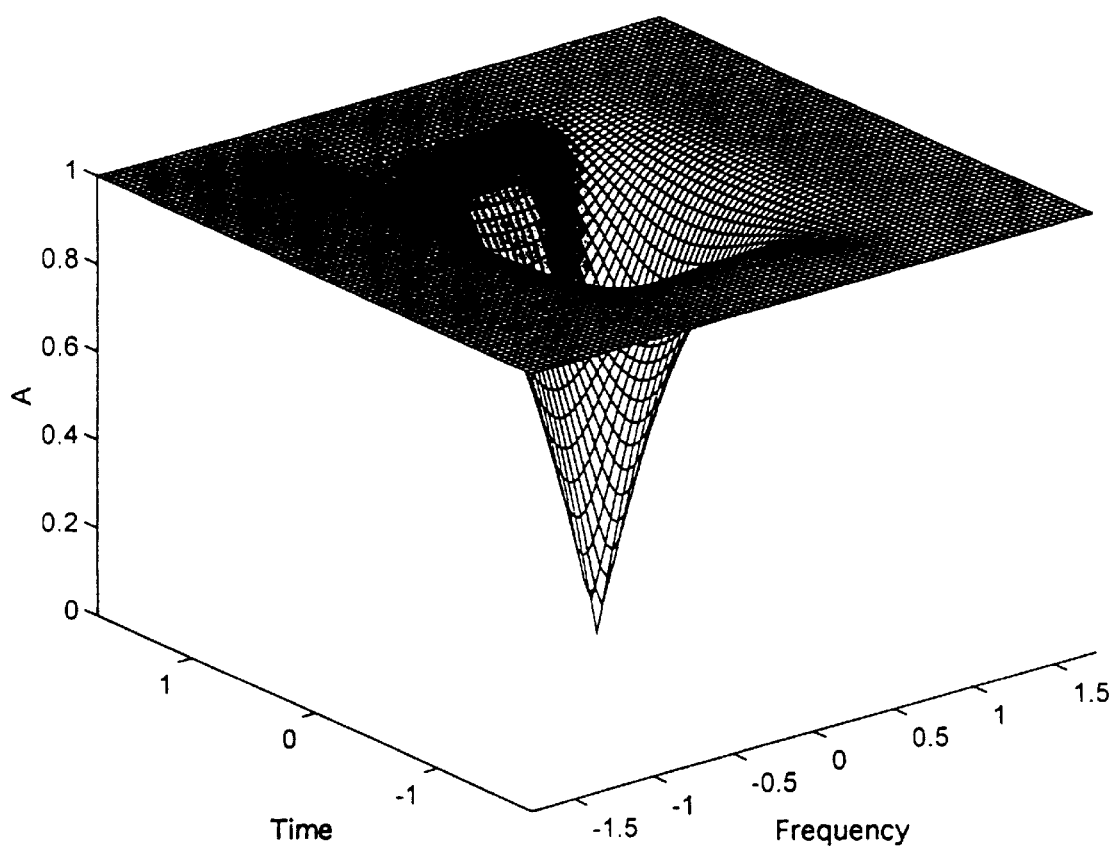
Figure 6A:
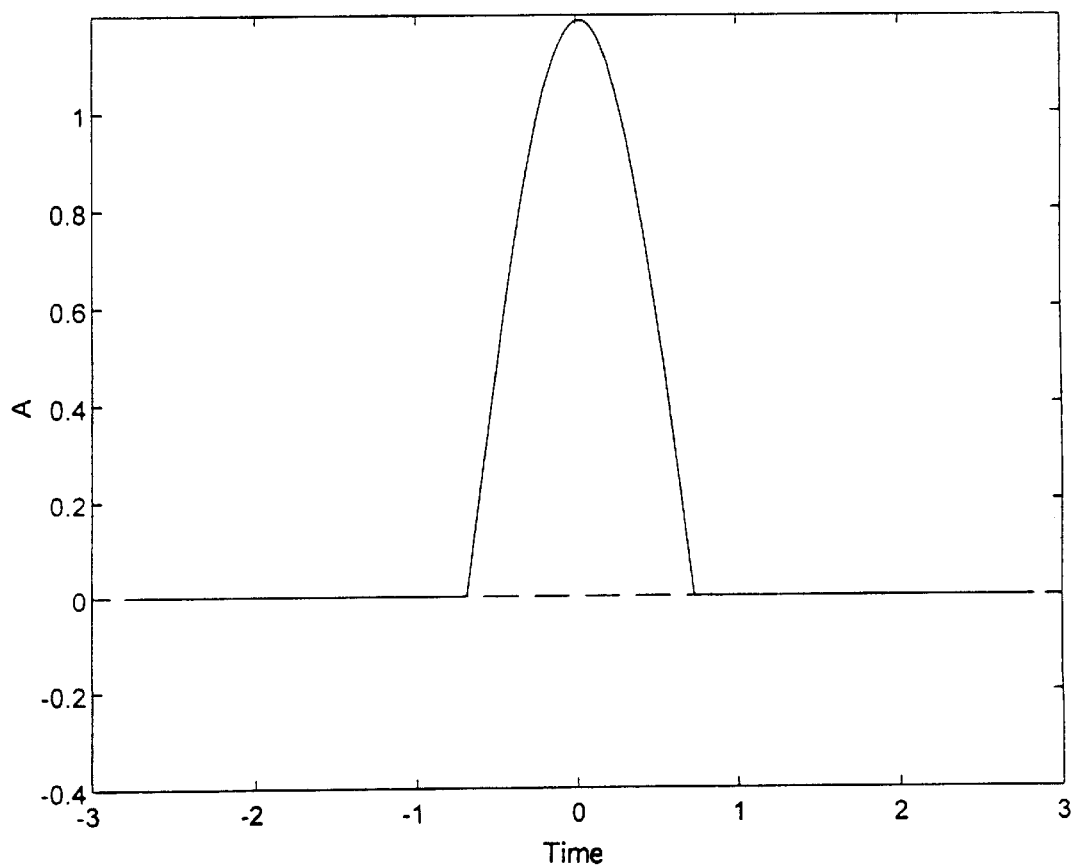
Figure 6B:
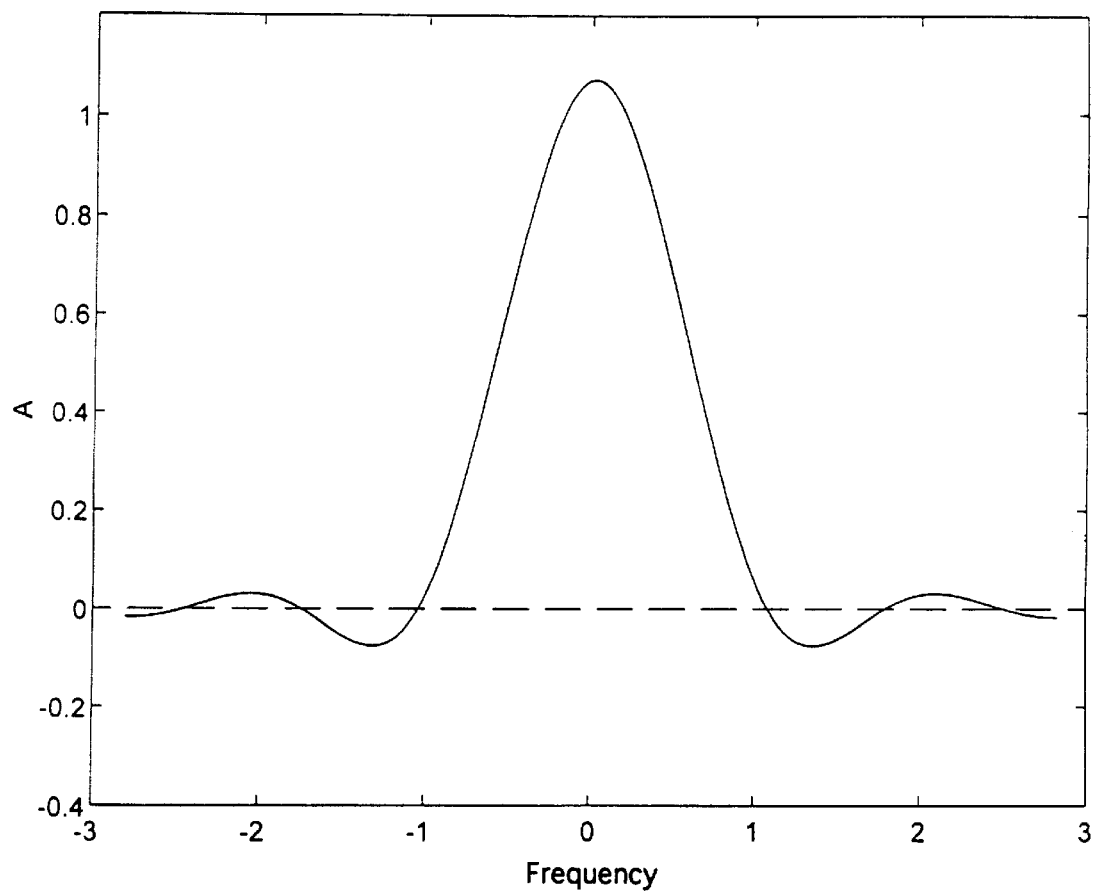
Figure 6C:
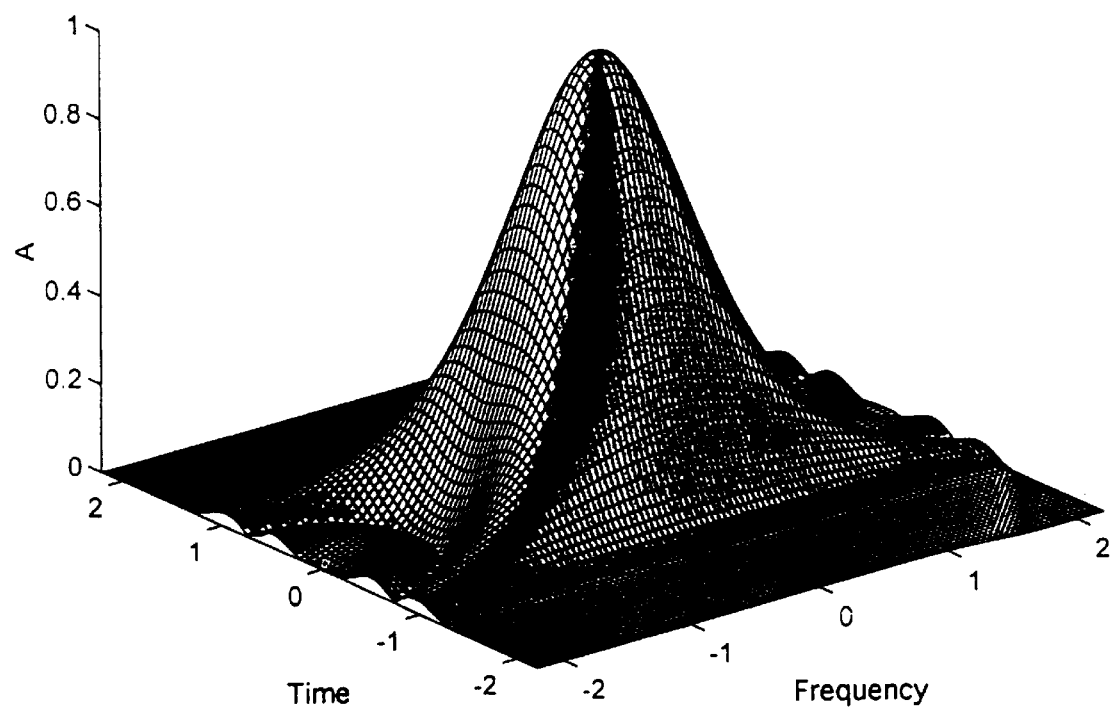
Figure 6D:
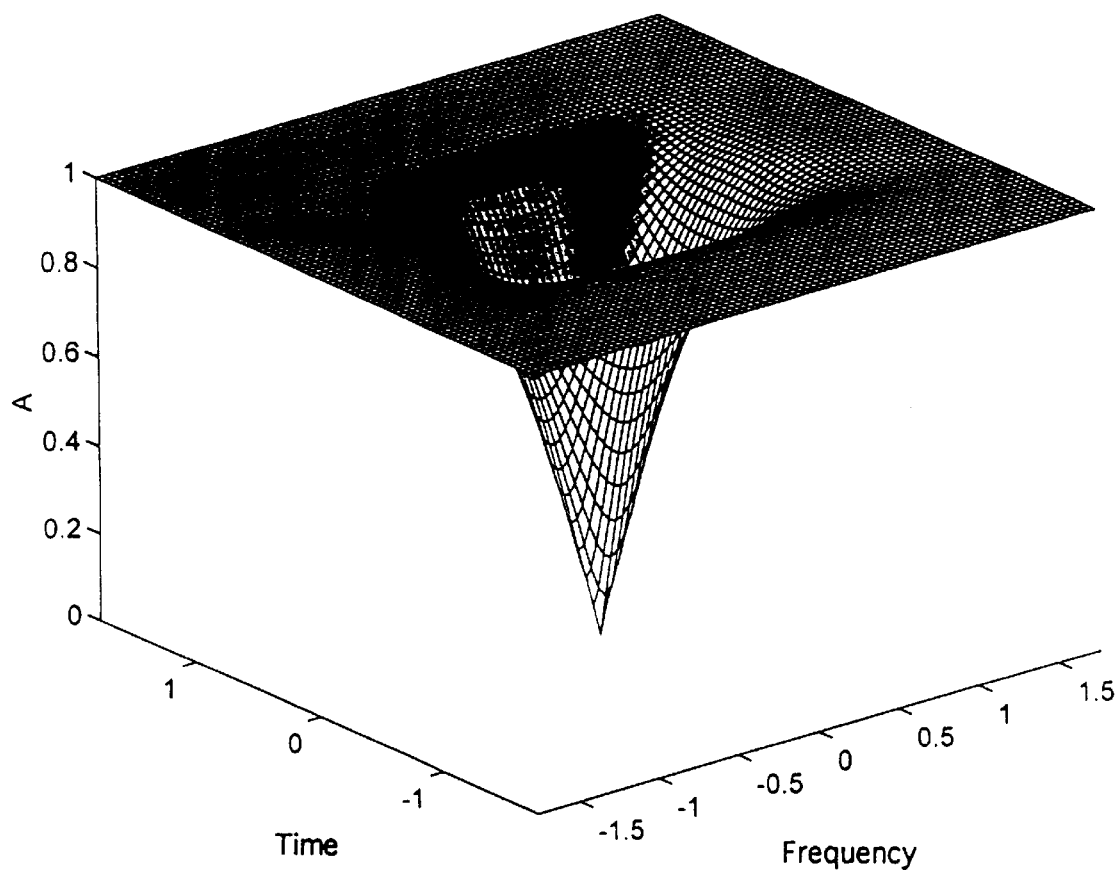

FIGS. 4C and 4D relate to the OFDM/QAM modulation with a guard interval (the prototype function and Fourier transform are identical to those of the OFDM/QAM illustrated in FIGS. 3A and 3C. The use of a guard interval creates a flat zone at a level of the ambiguity function. In fact, the term that ought to be used in this case is rather that of "cross-ambiguity". Obviously, this flat part is found at the intersymbol function, giving immunity to temporal errors. The figures show the case of a guard interval $0.25\,\tau_0$.

At the level of the frequency errors, the properties are the same as those of the standard OFDM.

The cost of the guard interval is acceptable when the field of interest concerns modulations with low spectral efficiency. On the contrary, it becomes prohibitive if it is sought to have high spectral efficiency: let us take for example a guard interval equal to a quarter of the useful symbol. Under these conditions, in order to have a net efficiency of 4 bits/s/Hz, it is necessary to have a system of modulation. and encoding with a rough efficiency of 5 bits/s/Hz, giving a loss of 3 dB with respect to Shannon's limit capacity. And moreover, to this loss it is necessary to add an additional loss of 1 dB due to the power that is "unnecessarily" transmitted in the guard interval. In all therefore, it is 4 dB that are lost with respect to the optimum.

FIGS. 5A to 5D present the case of the OFDM/OQAM.

The temporal response of the OFDM/OQAM has a better shape than that of the OFDM/QAM. Nevertheless, the temporal decrease will be only in 1/t². The ambiguity function is cancelled out on a lattice with a density ½. The sensitivity to frequency errors is greater than that to temporal errors. The parameter x is equal to 0.8765.

FIGS. 6A to 6D relate to the first embodiment of the invention corresponding to the OFDM/MSK modulation. It is ascertained that it has properties strictly identical to those of the OQAM in reversing the temporal and frequency scales. The parameter x is unchanged.

Finally, FIGS. 7A to 7D present the OFDM/IOTA modulation. This modulation has a fast decrease (in the mathematical sense of the term) in time and in frequency, thus enabling equalization with the greatest possible efficiency.

It furthermore has perfect symmetry with respect to these two axes. Its intersymbol function is almost ideal. In general, its behavior approaches that of a Gaussian function. The parameter x is equal to 0.9769.

The ambiguity function of the function A (FIG. 7C) can be compared with that of a Gaussian function as illustrated in FIG. 8. The general shape of these two functions is very similar at the peak. On the contrary it is different at the base.

FIG. 7E gives a view in a logarithmic scale of the decrease in time of the IOTA signal. It can be seen that the amplitude of the signal decreases linearly in logarithmic scale (in time and frequency of course since the two aspects are identical), namely exponentially in terms of linear scale. This property therefore makes it possible, in a practical embodiment, to truncate the waveform and thus limit the complexity of the receiver.

5.6. Principle of a transmitter

FIG. 9 shows a simplified block diagram of a transmitter of a signal according to the invention. The method of transmission is deduced therefrom directly.

A binary source with a high bit rate (typically some tens of megabits/s) is considered. The term binary source is understood to mean a series of data elements corresponding to one or more sampled, digital or analog source signals 91 of all types (sounds, images, data). These binary data elements are subjected to a binary-to-binary channel encoding 92 adapted to fading channels. It is possible for example to use a trellis coded modulation possibly concatenated with a Reed-Solomon code. More specifically, if a spectral efficiency of 4 bits/Hz is desired, it is possible to use a code with an efficiency of ⅔ associated with an 8AM modulation taking eight amplitude levels.

Then, according to the principle explained in the patent FR-88 15216, these encoded data elements are distributed (93) in the time-frequency space so as to provide the necessary diversity and decorrelate the Rayleigh fading that affects the symbols transmitted.

More generally, a first binary-to-binary encoding, a time and frequency interlacing and a mapping operation are carried out. It is clear that the interlacing may be done without distinction before or after the mapping depending on the needs and the codes used.

At the end of this encoding operation, there are real symbols to be transmitted $a_{m,n}$. The principle of the making of the OFDM/MSK or OFDM/IOTA modulator 94 is similar to that of an OFDM/OQAM transmitter. Only the prototype waveform differs. Reference may be made to [15] for a detailed description of the modulation system. To build the signal to be transmitted, the symbols of the same order n are grouped together, and the following is computed:

$$s(t) = \sum_{m,n} a_{m,n} x_{m,n}(t) = \sum_n \sum_m a_{m,n} i^{m+n} e^{2i\pi m v_0 t} x(t - n\tau_0) \quad (30)$$

This operation may advantageously be done digitally by a fast Fourier transform (FFT) relating to all the symbols of the same order n, followed by a multiplication of the resultant waveform by the prototype function IOTA and finally by an addition of the symbols of different ranks (summation according to the index n).

The complex signal thus generated is then converted into analog form 98 and then transposed to the final frequency by a two-channel quadrature modulator 99 (I & Q modulator) and finally amplified 910 before being transmitted 911.

5.7. Principle of a receiver

FIG. 10 gives a schematic illustration of a receiver of a signal according to the invention (as well as the corresponding reception method).

The OFDM/MSK or OFDM/IOTA receiver is substantially similar to the one adapted to the OFDM/OQAM modulation. The input stages are conventional. The signal is preamplified 101 and then converted into intermediate frequency 102 in order to obtain the channel filtering 103. The intermediate frequency-signal is then converted into baseband at 105 on two channels in quadrature. In addition, the automatic gain correction (AGC) functions 104 are performed. These AGC functions control the preamplification 101.

Another solution consists in transposing the intermediate frequency signal to a low carrier frequency so as to sample the signal on a single channel, the complex representation being then obtained by digital filtering. Alternately, the RF signal may be transposed directly into baseband (direct conversion), the channel filtering being then done on each of the two channels I & Q. In every case, it is possible to return to a discrete representation of the signal of the complex envelope corresponding to the received signal.

In order to provide a detailed description of the digital processing in baseband, we shall consider a multicarrier type modulation characterized by the equation of the complex envelope of the transmitted signal:

$$s(t) = \sum_{m,n} a_{m,n} x_{m,n}(t) \quad (31)$$

Let us take a transmission channel characterized by its variable transfer function T(f,t) (see Appendix 2). The complex envelope of the received signal r(t) is written as follows:

$$r(t) = \int S(f) T(f,t) e^{2i\pi f t} df \quad (32)$$

The demodulator estimates (106) the transfer function T(f,t) by conventional means which for example may use a reference lattice of explicit carriers according to the patent FR-90 01491. To demodulate the signal proper (107), the channel is likened locally to a multiplier channel characterized by an amplitude and a phase corresponding to the value of T(f,t) for the instant and the frequency considered. To estimate $a_{m,n}(t)$, the received signal is therefore identified with the signal:

$$\tilde{r}(t) = \int S(f) T(mv_0, n\tau_0) e^{2i\pi f t} df = T(mv_0, n\tau_0) s(t) \quad (33)$$

It shall be supposed that:

$$T(mv_0, n\tau_0) = \rho_{m,n} i^{\theta_{m,n}} \quad (34)$$

The demodulator therefore performs the following processing operation:

$$\tilde{a}_{m,n} = \Re e \int r(t) e^{-i\theta_{m,n}} x^*_{m,n}(t) dt \quad (35)$$

In the case of a stationary channel with a transfer function $\rho e^{i\theta}$, the following is found obviously:

$$\tilde{a}_{m,n} = \rho a_{m,n} \quad (36)$$

In practice, the processing 107 is performed in digital form according to the method shown in FIG. 11. The receiver works similarly to an OFDM/OQAM receiver [13–16]. It performs the following processing operations:

multiplication 111 of said received signal r(t) by its prototype function x(t) 112;

"aliasing" 113 of the filtered waveform modulo $2t_0$;

application 114 of a Fourier transform (FFT);

correction 115 of the phase $q_{m,n}$ as a function of the estimation of the channel 116, comprising for example an estimation $r_{m,n}$ of the amplitude response and an estimation $q_{m,n}$ of the phase response of the transmission channel;

correction 117 of the phase corresponding to the term $i^{m+n}$, the data elements being alternately in phase and in quadrature;

the selection 118 of the real part of the coefficient obtained $\tilde{a}_{m,n}$ corresponding to the transmitted coefficient $a_{m,n}$ weighted by the amplitude response $r_{m,n}$ of the transmission channel.

This algorithm therefore enables the comprehensive computation of all the coefficients of a given index n. The magnitude of the corresponding complexity is approximately twice that of the algorithm used for the OFDM/QAM.

The coefficients thus obtained are then de-interlaced 108, symmetrically with the interlacing implemented at transmission, and then decoded 109 advantageously according to a soft decision decoding technique implementing for example an algorithm of the Viterbi algorithm type. If the channel decoding takes account of the estimation of the response of the amplitude of the channel $r_{m,n}$, the corresponding values are also de-interlaced 110. Furthermore, the de-interlacing is of course performed before or after the mapping depending on the point in time when the interlacing has been carried out at transmission.

APPENDIX 1: REFERENCES

[1] M. L. Doeltz, E. T. Heald and D.L. Martin, "Binary data transmission techniques for linear systems" Proceedings of the IRE, pp. 656–661, May 1957.

[2] R. R. Mosier, "A data transmission system using pulse phase modulation" IRE Conv. Rec. Ist Nat'l Conv Military Electronics (Washington, D.C., Jun. 17–19, 1957) pp. 233–238.

[3] G. A. Franco and G. Lachs, "An orthogonal coding technique for communications" 1961 IRE Internat'l Conv. Rec., vol. 9, pp. 126–133.

[4] H. F. Harmuth, "On the transmission of information by orthogonal time functions" AIEE Trans. (Communications and Electronics) vol. 79, pp. 248–255, July 1960.

[5] S. B. Weinstein and Paul M. Ebert, "Data transmission by frequency-division multiplexing using the discrete Fourier transform" IEEE Trans. Commun., vol. COM-19, pp. 628–634, October 1971.

[6] L. J. Cimini, "Analysis and simulation of a digital mobile channel using orthogonal frequency division multiplexing," IEEE Trans. Commun., vol. COM-33, pp. 665–675, July 1985.

[7] E. F. Casas and C. Leung, "OFDM for data communication over mobile radio FM channels—Part I: Analysis and experimental results" IEEE Trans. Commun., vol. 39, pp. 783–793, May 1991.

[8] E. F. Casas and C. Leung, "OFDM for data communication over mobile radio FM channels—Part II: Performance improvement"IEEE Trans. Commun., vol. 40, pp. 680–683, April 1992.

[9] I. Daubechies, "The wavelet transform, time-frequency localization and signal analysis" IEEE Trans. Inform. Theory, vol. IT-36, pp. 961–1005, September 1990.

[10] H. E. Jensen, T. Hoholdt, and J. Justesen, "Double series representation of bounded signals" IEEE Tranr. Inform. Theory, vol. IT-34, pp. 613–624, July 1988.

[11] R. W. Chang, "Synthesis of band-limited orthogonal signals for multi-channel data transmission" Bell Syst. Tech. J., vol. 45,.pp. 1775–1796, December 1966.

[12] B. R. Saltzberg, "Performance of an efficient parallel data transmission system" IEEE Trans. Commun. Technol., vol. COM-15, pp. 805–811, December 1967.

[13] R. W. Chang, "A theoretical study of performance of an orthogonal multiplexing data transmission scheme" IEEE Trans. Commun. Technol., vol. COM-16, pp. 529–540, August 1968.

[14] B. Hirosaki, "An analysis of automatic equalizers for orthogonally multiplexed QAM systems" IEEE Trans. Commun., vol. COM-28, pp. 73–83, January 1980.

[15] B. Hirosaki, "An orthogonally multiplexed QAM system using the discrete Fourier transform" IEEE Trans. Commun., vol. COM-29, pp. 982–989, July. 1981.

[16] B. Hirosaki, "A maximum likelihood receiver for an orthogonally multiplexed QAM system" IEEE Journal on Selected Areas in Commun., vol. SAC-22, pp. 757–764, September 1984.

[17] B. Hirosaki, S. Hasegawa, and A. Sabato, "Advanced group-band modem using orthogonally multiplexed QAM technique" IEEE Trans. Commun., vol. COM-34, pp. 587–592, June. 1986.

[18] John A. C. Bingham, "Multicarrier modulation for data transmission: An idea whose time has come" IEEE Communications Magazine, pp. 5–14,. May 1990.

[19] P. M. Woodward, "Probability and information theory with application to radar" Pergamon Press, London 1953.

[20] F. Amoroso and J. A. Kivett, "Simplified MSK signalling technique" IEEE Trans. Commun., vol. COM-25, pp. 433–441, April 1977.

[21] P. A. Bello, "Characterization of randomly time-variant linear channels" IEEE Trans. Commun. Systems, pp. 360–393, December 1964.

[22] P. M. Woodward, "Probability and information theory with application to radar" Pergamon Press, London 1953.

[23] M. Alard and R. Lassalle, "Principes de modulation et de codage canal en radiodiffusion numérique vers les mobiles" Revue de l'U.E.R, No. 224, August 1987, pp. 168–190.

APPENDIX 2

1. Modelling of the channel

1.1. General model

A dispersive channel may be considered to be a linear system having a pulse response that is variable in time. There are two ways of defining this pulse response. This approach will be based broadly on the conventions proposed in [21]:

the pulse response at input or input delay spread function $g(t,\tau)$ defined by:

$$r(t) = \int s(t-\tau) g(t,\tau) dt$$

where $s(t)$ and $r(t)$ respectively represent the signals transmitted and received, the pulse response at output or output delay spread function $h(t,\tau)$ defined by:

$$r(t) = \int s(t-\tau) h(t-\tau,\tau) dt$$

We evidently have $h(t,\tau) = g(t+\tau,\tau) \cdot h(t,\tau)$ represents the pulse response of the channel at the instant t. These conventions being established, it is possible to define the following characteristic functions:

the delay-Doppler spread function $U(\tau,\nu)$ is characterized by:

$$g(t,\tau) = \int U(\tau,\nu) e^{i2\pi\nu t} d\nu$$

with $r(t) = \iint U(\tau,\nu) s(t-\tau) e^{i2\pi\nu t} d\nu d\tau$ the Doppler-delay spread function $V(\nu,\tau)$ is characterized by:

$$h(t,\tau) = \int V(\nu,\tau) e^{-i2\pi\nu t} d\nu$$

with $r(t) = \iint V(\nu,\tau) s(t-\tau) e^{i2\pi\nu(t-\tau)} d\nu d\tau$ Or quite simply:

$$V(\nu,\tau) = e^{i2\pi\nu\tau} U(\tau,\nu)$$

the time-variant transfer function $T(f,t)$ is characterized by:

$$T(f,t) = \int g(t,\tau) e^{-i2\pi f\tau} d\tau$$

with $r(t) = \int S(f) T(f,t) e^{i2\pi ft} df$

The same equation as in the case of a stationary channel is therefore got again, the difference being simply that the transfer function becomes variable in time. This transfer function $T(f,t)$ is the 2D Fourier transform of $U(\tau,\nu)$, namely:

$$T(f,t) = \iint U(\tau,\nu) e^{-i2\pi f\tau} e^{i2\pi\nu t} d\tau d\nu$$

In any case, it is assumed that $U(\tau,\nu)$ has a bounded support. This means that the transfer function $T(f,t)$ can be represented by a lattice of discrete values by virtue of the sampling theorem.

1.2. The static delay-Doppler model

The delay-Doppler model is defined by the equation:

$$r(t) = \iint U(\tau,\nu) s(t-\tau) e^{i2\pi\nu t} d\tau d\nu$$

This equation shows the channel as a sum of elementary channels characterized by an amplitude, a phase, a temporal offset and a frequency offset. It is therefore legitimate to take an interest in the behavior of the various existing modulations of this type of channel, which shall be named the static delay-Doppler model.

The equation of the channel is written then in the following simplified form:

$$r(t) = A e^{i\theta} s(t-\tau) e^{i2\pi\nu t}$$

2. Performance characteristics of the OFDM in the non-stationary channels

2.1. General case

Let us consider an OFDM multicarrier modulation of any type (OFDM/QAM, OFDM/OQAM or OFDM/IOTA) characterized by the generic equation:

$$s(t) = \sum_{k \in E} a_k x_k(t)$$

$a_k$ being real variables, E being a 2D lattice with a density 2 in the time-frequency space, the functions $x_k(t)$ being translated functions in time and in frequency of one and the same prototype function $x(t)$ and constituting a Hilbertian basis of $L^2(R)$.

$$x_k(t) = e^{i\phi_k} x(t-\tau_k) e^{2i\pi\nu_k t}, k \in E$$

It will be noted that no hypothesis is made on the structure of the lattice E. In the particular case of the OFDM/QAM, this lattice can be divided into two co-localized sub-lattices with phases in quadrature.

The demodulation operation can be written as follows:

$$\hat{a}_m = \Re e[e^{-i\phi} \int r(t) x^*_n(t) dt]$$

$\phi$ being a phase estimated by the demodulator and $r(t)$ being the complex envelope of the signal received. It is therefore possible to write:

$$\hat{a}_n = \Re e[e^{-i\phi} \int [\iint U(\tau,\nu) s(t-\tau) e^{i2\pi\nu t} d\tau d\nu] k_n^*(t) dt] = \Re e[e^{-i\phi} \iint U(\tau,\nu) [\int s(t-\tau) e^{i2\pi\nu t} x_n^*(t) dt] d\tau d\nu]$$

Now:

$$\int s(t-\tau) e^{i2\pi\nu t} x_n^*(t) dt = \sum_k a_k \int x_k(t-\tau) e^{i2\pi\nu t} x_n^*(t) dt =$$

$$\sum_k a_k e^{i(\varphi_x - \varphi_n)} e^{2i\pi(\nu^* \mu_k - \nu_n)(\tau^* \tau_k + \tau_n)} A_x(\tau_n - \tau_k - \tau, \nu_n - \nu_k - \nu)$$

It is deduced therefrom that:

$$\hat{a}_n = \sum_k a_k \Re e\left[ e^{-i\phi} e^{i(\varphi_k - \phi_n)} \iint e^{2i\pi(\nu^* \nu_k - \nu_n)(\tau^* \tau_k + \tau_n)} U(\tau,\nu) A_x(\tau_n - \tau_k - \tau, \nu_n - \nu_k - \nu) d\tau d\nu \right]$$

The optimum value of $\phi$ is the one that maximizes the coefficient $\hat{a}_n$, giving:

$$\phi = Arg \iint e^{2i\pi\nu\tau} U(\tau,\nu) A_x(-\tau,-\nu) d\tau d\nu$$

Although they are general, the above equations can hardly be exploited. However they show that the useful signal and the intersymbol appear as integrations of the ambiguity function weighted by the delay-Doppler spread function.

2.2. Case of the static channel

If we look at a static delay-Doppler type of channel, characterized by a phase $\theta$, a delay $\tau$ and an offset $\nu$ (the amplitude A will be normalized at 1), the demodulation will be done similarly by introducing a phase parameter $\phi$ into the estimator. The result of this operation is written as follows:

$$\hat{a}_n = \text{Re}\left[\int r(t)x_n^*(t)e^{-i\phi}dt\right]$$

$$= \text{Re}\left[e^{i\theta-\phi}\int s(t-\tau)e^{2i\pi\alpha}x_n^*(t)dt\right]$$

$$= \sum_{k\in E} a_k \text{Re}\left[\int e^{i(\theta-\phi)}x_k(t-\tau)e^{2i\pi E}x_n^*(t)dt\right]$$

$$= \sum_{k\in E} a_k \text{Re}\left[\int e^{i(\theta-\phi)}e^{-2i\pi\tau(t+\tau)}x_n(t+\tau)x_k^*(t)dt\right]$$

$$= \sum_{k\in E} a_k c_k,$$

$$\text{avec } c_k = \text{Re}\left[\int e^{i(\theta-\phi)}e^{-2i\pi\tau(t+\tau)}x_n(t+\tau)x_k^*(t)dt\right]$$

The demodulated signal is therefore finally written as:

$$\hat{a}_n = c_n a_n + \sum_{k\in E, k\neq n} c_k a_k$$

The second term represents the intersymbol interference (II). If the data elements $a_k$ are considered to be independent random variables with a variance $\sigma^2$, the variance I of the II is written as follows:

$$I = \sum_{k\in E, k\neq n} c_k^2 \sigma^2$$

Now, the coefficients $c_k$ are the coefficients of the breakdown of the function $e^{i(\phi-\Phi)}e^{-2i\pi v(t+\tau)}x_n(t+\tau)$, with a norm equal to unity, on the Hilbertian basis of the functions $x_k(t)$. We therefore have:

$$\sum_{k\in E} c_k^2 = 1 \text{ et } I = (1-c_n^2)\sigma^2$$

In other words, the variance of the received signal is constant and is distributed between the "useful" signal $c_n a_n$ and II, having a variance $I=(1-c_n^2)\sigma^2$. The computation of the coefficient cn gives:

$$c_n = \Re e[\int e^{i(\phi-\theta)}e^{-2i\pi\tau(t+\tau)}x_n(t+\tau)x_n^*(t)dt] = \Re e[e^{i(\phi-\theta-\pi v\tau)}\int e^{-2i\pi x}x_n(t+\tau/2)x_n^*(t-\tau/2)\,dt] = \Re e[e^{i(\phi-\theta-\pi v\tau)}A_{xn}(\tau,v)]$$

Now, the ambiguity function of xn is written as:

$$A_{xn}(\tau,v) = e^{2i(v_n\tau - t n)}A_x(\tau,v)$$

Finally, it is possible to write:

$$c_n = \Re e[e^{i(\phi\theta - \pi v\tau)}e^{2iv_n\tau + \tau_n v}A_x(\tau,v)]$$

It will be assumed that the demodulation phase $\phi$ is written in the form $\phi_{opt}+\Delta\phi$, where $\phi_{opt}$ is the demodulation phase that minimizes the II, i.e. maximizes $c_n$, giving:

$$\phi_{opt} = \theta + \pi v\tau + 2\pi(\tau_n v - v_n \tau)$$

Then, the variance of the II can be written simply as follows:

$$I = (1-(\Re e[A_x(\tau,v)e^{i\Delta\phi}])^2)\sigma^2$$

Whem the prototype function is an even order function (which corresponds to the case of the method of construction of the Hilbertian bases described in the main part of this document), the ambiguity function is real and we therefore have:

$$I = (1-A_x^2(\tau,v)\cos^2\Delta\phi)\sigma^2$$

This result is quite remarkable since it shows that the sensitivity to the delay and to the Doppler phenomenon of any multicarrier modulation depends only on the ambiguity function of its prototype function. Hereinafter, the term "intersymbol function" (used loosely to designate the intersymbol interference function), will be used to designate the function $\text{Is}(\tau,v)=\sqrt{1-A_x^2(\tau,v)}$ in general), representing the mean quadratic value of the intersymbol normalized by the mean quadratic value of the data elements in the case of an estimation of optimal phase.

3. Comparative analysis of the different types of OFDM 3.1. Theoretical limits

The description here below shall deal with the properties of the intersymbol function. It is observed that the sensitivity of a multicarrier modulation is directly related to the behavior of the ambiguity function of the corresponding prototype function in the vicinity of (0,0). The problem raised is quite similar to the problems of uncertainty encountered in the field of radar and reference may be made to the abundant literature on the subject (see for example [22]). Without any loss of generality, it is possible to choose a function x(t), by an appropriate temporal and frequency translation in such a way that its first order moments are zero, namely:

$$\int t|x(t)|^2 dt = \int f|X(f)|^2 df = 0$$

Under these conditions, it is easy to verify that the partial derivatives of the first order cancel each other out:

$$\frac{\partial A_x}{\partial v}(\tau,v) = -2i\pi \int e^{-2i\pi t}tx(t+\tau/2)x^*(t-\tau/2)dt \Rightarrow$$

$$\frac{\partial A_x}{\partial v}(0,0) = -2i\pi \int t|x(t)|^2 dt = 0$$

$$\frac{\partial A_x}{\partial \tau}(\tau,v) = -2i\pi \int e^{-2f\tau} fX(f+v/2)X^*(f-v/2)df \Rightarrow$$

$$\frac{\partial A_x}{\partial \tau}(0,0) = -2i\pi \int f|X(f)|^2 df = 0$$

It is possible to characterize the behavior of the ambiguity function around (0,0) on the basis of the second order partial derivatives:

$$\frac{\partial^2 A_x}{\partial \tau \partial v}(\tau,v) = -i\pi \int te^{-2i\pi E}(x'(t+\tau/2)x^*(t-\tau/2) - x(t+\tau/2)x'^*(t-\tau/2))dt \Rightarrow$$

$$\frac{\partial^2 A_x}{\partial \tau \partial v}(0,0) = 2\pi \int t\,\text{Im}[x'(t)x^*(t)]dt$$

It will be assumed that $$\frac{\partial^2 A_x}{\partial \tau \partial v}(0,0) = \mu_x$$

$$\frac{\partial^2 A_x}{\partial v^2}(\tau,v) = -4\pi^2 \int e^{-2iE\pi}t^2 x(t+\tau/2)x^*(t-\tau/2)dt \Rightarrow$$

$$\frac{\partial^2 A_x}{\partial v^2}(0,0) = -4\pi^2 \int t^2|x(t)|^2 dt = -4\pi^2 \Delta t^2$$

-continued $$\frac{\partial^2 A_x}{\partial \tau^2}(\tau, v) = -4\pi^2 \int e^{-2i\pi f \tau} f^2 X(f+v/2) X^*(f+v/2) df \Rightarrow$$

$$\frac{\partial^2 A_x}{\partial \tau^2}(0, 0) = -4\pi^2 \int f^2 |X(f)|^2 df = -4\pi^2 \Delta f^2$$

Let us consider the Taylor-Young development of the ambiguity function in (0,0):

$$A_x(d\tau, dv) = 1 - 2\pi^2(\Delta t^2 dv^2 + \Delta f^2 d\tau^2) + \mu dv d\tau + o(dv^2 + d\tau^2)$$

A deduction is made therefrom of the Taylor-Young development of the variance of the intersymbol:

$$I = (1 - (\Re e[A_x(\tau,v)])^2 \cos^2 \Delta \phi) \sigma^2$$

that is:

$$I(d\tau, dv, d\phi) = \sigma^2 [4\pi^2(\Delta t^2 dv^2 \Delta f^2 d\tau^2) - 2 \mu dv d\tau + d\phi^2 + o(dv^2 d\tau^2 + d\phi^2)]$$

It is deduced therefrom that the intersymbol function Is accepts, at the outset, a tangential cone with the following equation:

$$z = \sqrt{4\pi^{2(\Delta t^2 v^2 + \Delta f^2 \tau^2) - 2\mu v \tau}}$$

The intersection of this cone with the plane z=1 (maximum intersymbol) demarcates a surface with an elliptic contour whose area $\xi$ may be considered as a measure of the sensitivity to the delay and to the Doppler phenomenon. When $\mu_x$ is zero, this ellipse has the temporal and frequency axes as its axes of symmetry and extends from $\pm 1/2\pi\Delta f$ along the temporal axis and $\pm \frac{1}{2}\pi\Delta t$ along the frequency axis. We therefore have:

$$\xi = \frac{1}{4}\pi\Delta t\Delta f$$

In view of Heisenberg's inequality, $\xi$ cannot exceed unity. This result is generalized when $\mu_x$ is different from 0. Let us consider the function y(t) obtained by multiplying the function x(t) by a wobbulation:

$$y(t) = e^{i\pi\beta^2} x(t) \rightarrow y'(t) = e^{i\pi\beta^2}(x'(t) + 2i\pi\beta t X(t))$$

It is therefore possible to write:

$$\mu_y = \frac{\partial^2 A_y}{\partial \tau \partial v}(0, 0) = 2\pi \int t \operatorname{Im}[y'(t) y^*(t)] dt$$

$$= 2\pi \int t \operatorname{Im}[x'(t) x^*(t)] dt + 4\pi^2 \beta \int t^2 |x(t)|^2 dt$$

$$= \mu_x + 4\pi^2 \beta \Delta t^2$$

It is therefore always possible to cancel $\mu_y$ by choosing $\beta$ appropriately. Now, the operation of multiplication by a wobbulation achieves a simple change of axes of the associated ambiguity function with preservation of the areas. It is deduced therefrom that the parameter $\xi$ is always between 0 and 1.

This result is extremely important since it enables the comparison of the performance characteristics of all the MCMs in the dispersive channels on the basis of a single parameter. It can be seen therefore that these performance characteristics depend only on the concentration of the associated prototype function. The optimum is achieved virtually by the Gaussian function but this optimum is inaccessible since the Gaussian functions do not enable the construction of a Hilbertian basis.

APPENDIX 3

1. Introduction

This appendix gives a method of construction of prototype functions verifying the requisite criteria of orthogonality. The method can be used to obtain an infinity of functions, among them a particular solution (called an IOTA function) possessing the particular feature of being identical to its Fourier transform.

2. Ambiguity function

This chapter recalls the main properties of the ambiguity function and describes various operators acting on this function.

2.1 Reminders concerning the ambiguity function 2.1.1 Definitions

Let us take a function x(t) and its Fourier transform X(f). With this function, it is possible to associate its temporal and frequency products respectively defined by:

$$\begin{cases} \gamma_x(t, \tau) = x(t+\tau/2) x^*(t-\tau/2) \\ \Gamma_x(f, v) = X(f+v/2) X^*(f-v/2) \end{cases}$$

The Wigner-Ville transform and the ambiguity function of x are then given by:

$$\begin{cases} W_x(t, f) = \int \gamma_x(t, \tau) e^{-2i\pi f \tau} d\tau = \int \Gamma_x(f, v) e^{2i\pi t v} dv \\ A_x(\tau, v) = \int \gamma_x(t, \tau) e^{-2i\pi t v} dt = \int \Gamma_x(f, v) e^{2i\pi f \tau} df \end{cases}$$

2.1.2. Properties of symmetry of the ambiguity function

Let us take a function x(t). The notations $x^-$ and $\tilde{x}$ will be applied respectively to the functions defined as follows:

$$\begin{cases} x^-(t) = x(-t) \\ \tilde{x}(t) = x^*(-t) \end{cases}$$

We then have the relationships:

$$A_x(\tau, v) = \int e^{-2i\pi v x} x(t+\tau/2) x^*(t-\tau/2) dt = \int e^{-2i\pi v x} x(-t-\tau/2) x^*(-t+\tau/2) dt$$

that is, assuming that u=-t:

$$A_x(\tau, v) = \int e^{2i\pi v u} x(-u+\tau/2) x^*(-u-\tau/2) du = \int e^{2i\pi v u} x(u-\tau/2) x^*(u-\tau/2) du = A_x^-(\tau, v)$$

It is concluded therefrom in particular that if a function x is an even order value, namely that $x=x^-$, then its ambiguity function is real. Furthermore, the following relationship will be noted:

$$A_x^*(\tau, v) = \int e^{-2i\pi v u} x^*(u+\tau/2) x(u-\tau/2) du = A_{\tilde{x}}(-\tau, v)$$

By combining these two relationships, we get:

$$A_{\tilde{x}}(\tau, v) = A_x(\tau, -v)$$

2.1.3. Ambiguity function and Fourier transform

It is possible to rewrite the definition of the ambiguity function as follows:

$$A_x(\tau, v) = \int \Gamma_x(f, v) e^{2i\pi v f \tau} df = \int \gamma_x(f, v) e^{2i\pi x f} df = A_x(v, -\tau)$$

or again: $A_x(\sigma, v) = A_x(-v, \tau)$

2.1.4. Ambiguity function and time-frequency translation

Let us consider a translated function of any prototype function x(t), namely:

$$x_k = e^{i\phi_k} e^{2i\pi \nu_k t} x(t-\tau_k)$$

The associated ambiguity function is written as follows:

$$A_{xk}(\tau,\nu) = \int e^{-2i\pi x} e^{i\phi_k} e^{2i\pi \nu_k (t+\tau/2)} x$$

$$(t-\tau_k+\tau/2) e^{-\rho k} e^{-2i\pi \nu_k(t-\tau/2)} x$$

$$*(t-\tau_k-\tau/2)dt = \int e^{-2i\pi x} e^{2i\pi \nu k \, \tau_k} x(t-\tau_k+\tau/2) x^*(t-\tau_k-\tau/2) dt$$

that is, assuming that $u = t - \tau_k$ $$A_{xk}(\tau,\nu) = e^{2i\pi(\nu \tau_k + \nu f k)} \int e^{-2i\pi u} x(\mu+\tau/2) x^*(\mu-\tau/2) du = e^{2i\pi(\mu_k+\pi k)} A_x(\tau,\nu)$$

2.2 Orthogonality and ambiguity function

2.2.1 General case

We consider two translated functions of one and the same function x(t), namely:

$$x_k = e^{i\rho_k} e^{2i\pi \nu_k t} x(t-\tau_k) \quad x_K = e^{i\rho_K} e^{2i\pi \rho_K t} x(t-\tau_k)$$

The scalar product of these two functions can be written as follows:

$$\langle x_k | x_k \rangle = e^{i(\rho_k - \rho_k)} \int e^{2i\pi(\nu_k - \nu_k)t} x(t-\tau_k) x^*(t-\tau_K) dt$$

that is, assuming that $u = t - (\tau_k + \tau_K)/2$:

$$\langle x_k | x_k \rangle = e^{i(\rho_k - \rho_k)} e^{2i\pi(\nu_k - \nu_k)(\tau_k + \tau_k)}$$

$$\int e^{2i+(\nu_k - \nu_k)\mu} x(\mu+(\tau_k-\tau_k)/2) x^*(\mu-(\tau_K-\tau_K)/2) du =$$

$$e^{i(\phi_k-\phi_k)} e^{2i\pi(\nu_k-\nu_k)(\tau_k+\tau_k)} A_x(\tau_k-\tau_k, \nu_K-\nu_k)$$

3. Hilbertian bases on the orthogonal lattices

3.1. General principles of construction

We consider a set of functions {xm n} defined by:

$$x_{m,n}(t) = e^{i(m+n)\pi/2} e^{2i\pi n\nu_0 t} x(t-n\tau_0) \quad avec \, \nu_0 \tau_0 = \frac{1}{2}$$

A search is made for the conditions on x(t) so that the set {Xm,n} is a Hilbertian basis of $H_R$. It is laid down that x(t) is an even function whose ambiguity function $A_x$ is therefore real.

The scalar product in R of $x_{m,n}$ and of $x_{m',n'}$ can be written as:

$$\langle x_{m,n} | x_{m',n'} \rangle_R = \Re e [e^{i(m+n-m'-n')\pi/2} e^{i\pi(m-m')(n+n')\nu_0 \tau_0} A_x((n'-n)\tau_0, (m'-m)\nu_0)]$$

$$= \Re e [e^{i((m-m')+(n-n')+(n+n'))\pi/2} A_x((n'-n)\tau_0, (m'-m)\nu_0)]$$

The following relationship of congruence modulo 2 will be noted:

$$(m-m')+(n-n')+(m-m')(n+n') \equiv 1-(m-m'+1)(n-n'+1)$$

Consequently, if $(m,n) \neq (m',n')$ modulo2, the scalar product is zero. The lattice $\{X_{m,n}\}$ can therefore be broken up into four sub-lattices characterized by: {m even, n even}, {m even, n odd}, {m odd n even}, {m odd, n odd}. The orthogonality between functions belonging to different sub-lattices is therefore automatic and does not depend on the properties of the prototype function, since this function is an even value.

What remains to be done then is to ensure that the functions of one and the same sub-lattice are mutually orthogonal. It is enough for this purpose that the ambiguity function $A_x$ should verify:

$$A_x(2n\tau_0, 2m\nu_0) = 0 \quad \forall (m,n) \neq (0,0)$$

It can be seen therefore that the problem of the construction of the Hilbertian bases of $H_R$ on the orthogonal lattice with a density 2 amounts to that of the construction of an even prototype function whose ambiguity function is cancelled out on a lattice of the density ½.

3.2. Methods of orthogonalization

3.2.1. Temporal orthogonalization

Definition:

Let us take a function x(t) with a Fourier transform X(f). The designation $O_t$ is given to the temporal orthogonalization operator which associates a function y(t) with x(t), this function y(t) being defined by its Fourier transform Y(f):

$$Y(f) = \frac{X(f)}{\sqrt{\nu_0 \sum_k |X(f-k\nu_0)|^2}}$$

By construction, we have:

$$\nu_0 \sum_m |Y(f-m\nu_0)|^2 = \nu_0 \sum_m \Gamma_y(f-m\nu_0, 0) = 1$$

namely by reverse Fourier transform:

$$\left[\sum_n \delta(\tau - 2n\tau_0)\right] A_y(\tau, 0) = \delta(\tau)$$

or again:

$$A_y(2n\tau_0, 0) = 0 \quad \forall n \neq 0 \quad et \, A_y(0,0) = 1$$

The orthogonalization is therefore really done on the temporal axis. It is furthermore noted that this operator normalizes y.

Let X be a Gaussian function and $y = O_t x$. Let us consider the expression:

$$\Gamma_y(f, 2m\nu_0) = Y(f+m\nu_0) Y^*(f-m\nu_0)$$

$$= \frac{X(f+m\nu_0) X^*(f-m\nu_0)}{\nu_0 \sum_k |X(f-k\nu_0)|^2}$$

Since X is a Gaussian function, it is possible to write:

$$X(f+m\nu_0) X^*(f-m\nu_0) = c_m |X(f)|^2$$

where $c_m$ is a constant. It is deduced therefrom that:

$$\Gamma_y(f, 2m\nu_0) = c_m \Gamma_y(f,0)$$

By reverse Fourier transform we get:

$$A_y(\tau, 2m\nu_0) = c_m A_y(\tau, 0)$$

Consequently:

$$\forall m, \forall n \neq 0 \, A_y(2n\tau_0, 2m\nu_0) = 0$$

The temporal orthogonalization operator $O_t$ therefore orthogonalizes the entire lattice except for the frequency axis.

Theorem 1

Let X be a Gaussian function and $y = O_t x$, then:

$$\forall m, \forall n \neq 0 \, A_y(2n\tau_0, 2m\nu_0) = 0$$

3.2.2. Frequency orthogonalization

Definition

Let us take a function x(t). $O_f$ is the designation given to the frequency orthogonalization operator which associates a function y(t) with x(t), function y(t) being defined by:

$$y(t) = \frac{x(t)}{\sqrt{\tau_0 \sum_k |x(t-k\tau_0)|^2}}$$

By construction, we have:

$$\tau_0 \sum_n |y(t-n\tau_0)|^2 = \tau_0 \sum_n \gamma_y(t-n\tau_0, 0) = 1$$

giving, by Fourier transform:

$$\left[\sum_m \delta(\nu - 2m\nu_0)\right] A_y(0, \nu) = \delta(\nu) \text{ avec } \nu_0 \tau_0 = 1/2$$

or again:

$$Ahd\ y(0, 2m\nu_0)=0\ \forall m \neq 0\ et\ A_y(0,0)=1$$

The orthogonalization is therefore really done on the frequency axis. It is furthermore noted that this operator normalizes y.

Let x be a Gaussian function and $z=O_f y$, with $y=O_t x$. Let us consider the expression:

$$\gamma_z(t, 2n\tau_0) = z(t+n\tau_0)z^*(t-n\tau_0) = \frac{y(t+n\tau_0)y^*(t-n\tau_0)}{\tau_0 \sum_k |y(t-k\tau_0)|^2}$$

It is therefore possible to write:

$$\gamma_z(t,2n\tau_0)=\gamma_y(t,2n\tau_0)P(t)$$

where P(t) is a periodic function with a period $\tau_0$ that accepts a development in Fourier series of the type $\Sigma a_k e^{4i\mu t}$ By Fourier transform, we obtain:

$$A_z(2n\tau_0, \nu) = \sum_k a_k A_y(2n\tau_0, \nu - 2k\nu_0)$$

Where:

$$\forall m, \forall n \neq 0, A_y(2n\tau_0, 2m\nu_0)=0 \rightarrow \forall m,\ \forall n \neq 0, A_z(2n\tau_0, 2m\nu_0)=0$$

Furthermore by construction, $$\forall m \neq 0, A_z(0, 2m\nu_0)=0$$

We finally have:

$$\forall (m,n) \neq (0,0), A_z(2n\tau_0, 2m\nu_0)=0$$

Thus, the ambiguity function of z gets cancelled out outside (0,0) for all the multiples of $2\tau_0$ and $2\nu_0$, giving a lattice with a density ½.

Theorem 2

Let x be a Gaussian function and $z=O_f O_t x$, then:

$$\forall (m,n) \neq (0,0), A_z(2n\tau_0, 2m\nu_0)=0$$

3.3. The orthogonalization operator O

In view of the above, it can clearly be seen that there is a time-frequency scale that symmetrizes the writing of the equations: it is enough for this purpose to choose $\tau_0 = \nu_0 = 1/\sqrt{2}$. The scales will therefore be renormalized accordingly without harming the general character of the demonstrations.

3.3.1. Definition

The designation O is applied to the orthogonalization operator which associates, with a function x, the function y defined by:

$$y(u) = \frac{2^{1/4} x(u)}{\sqrt{\sum_k |x(u-k/\sqrt{2})|^2}}$$

Furthermore, the Fourier transform operator will subsequently be designated by F.

3.3.2. Idempotence of the operator O

Let z=Oy and y=Ox. It is possible to write:

$$z(u) = \frac{2^{1/4} y(u)}{\sqrt{\sum_k |y(u-k/\sqrt{2})|^2}}$$

$$= \frac{2^{1/4} y(u)}{\sqrt{\sum_k \left|\frac{2^{1/4} x(u-k/\sqrt{2})}{\sqrt{\sum_{k'} |x(u-(k+k')/\sqrt{2})|^2}}\right|^2}} = y(u)$$

We therefore have OOx=Ox which shows the idempotence of the operator O. In the same way, the dual operator $F^{-1}OF$ is also idempotent, since $F^{-1}OFF^{-1}OF=F^{-1}OOF=F^{-1}OF$.

3.3.3. Lemma 1

Let P be a periodic function with a period $1/\sqrt{2}$ and D a distribution having the form $$D(u) = \sum_k a_k \delta(u - k\sqrt{2})$$

Let x be any function:

$$[D*(Px)](u) = \sum_k a_k P(u-k\sqrt{2})x(u-k\sqrt{2})$$

$$= P(u)\sum_k a_k x(u-k\sqrt{2})$$

$$= [P(D*x)](u)$$

Lemma 1

Let P be a periodic function with a period $1/\sqrt{2}$ and D a distribution having the form $$D(u) = \sum_k a_k \delta(u - k\sqrt{2}).$$

Let x be any function. We have:

$$D*(Px)=P(Dx^*)$$

Lemma 2

Let us take the function $y_\alpha$ defined by $y_\alpha * D * x_\alpha$, with $x_a = (2a)^{1/4} e^{-\pi z^2}$, and D being a distribution having the form $$D(u) = \sum_k a_k \delta(u - k\sqrt{2})$$

It is therefore possible to write:

$$y_\alpha(u) = \sum_k a_k x_\alpha(u - k\sqrt{2})$$

Let us consider the sum:

$$\sum_k |y_\alpha(u - k/\sqrt{2})|^2 =$$
$$\sum_k \sum_{k',k''} a_{k'} a_{k''} x_\alpha(u - k/\sqrt{2} - k'\sqrt{2}) x_\alpha(u - k/\sqrt{2} - k''\sqrt{2})$$

Or again by application of the result given in appendix (§ 4):

$$\sum_k |y_\alpha(u - k/\sqrt{2})|^2 =$$
$$\sum_k \sum_{k',k''} a_{k'} a_{k''} e^{-\pi(\alpha(k'-k''))^2} |x_\alpha(u - (k + k' + k'')/\sqrt{2})|^2$$

and then by reorganizing the indices and redefining k as k+k'+k":

$$\sum_k |y_\alpha(u - k/\sqrt{2})|^2 = \sum_k \sum_{k',k''} a_{k'} a_{k''} e^{-\pi(\alpha(k'-k''))^2} |x_\alpha(u - k/\sqrt{2})|^2$$

It is therefore possible to write:

$$\sum_k |y_\alpha(u - k/\sqrt{2})|^2 = c \sum_k |x_\alpha(u - k/\sqrt{2})|^2$$

with $$c = \sum_{k',k''} a_{k'} a_{k''} e^{-\pi\alpha(k'-k'')^2}$$

The coefficient c can easily be estimated by rewriting the above relationship in the form:

$$\sum_k \gamma_{y_\alpha}(u - k/\sqrt{2}, 0) = c \sum_k \gamma_{x_\alpha}(u - k/\sqrt{2}, 0)$$

Giving, by Fourier transform:

$$\sqrt{2} \left[\sum_k \delta(\nu - k\sqrt{2})\right] A_{y_\alpha}(0, \nu) = c\sqrt{2} \left[\sum_k \delta(\nu - k\sqrt{2})\right] A_{x_\alpha}(0, \nu)$$

In particular, it is possible therefrom to deduce:

$$|y_a|^2 = A_{y_a}(0,0) = cA_{x_a}(0,0) = c|x_a|^2$$

We therefore have finally:

$$\frac{\sum_k |y_\alpha(u - k/\sqrt{2})|^2}{\|y_\alpha\|^2} = \frac{\sum_k |x_\alpha(u - k/\sqrt{2})|^2}{\|x_\alpha\|^2}$$

Lemma 2

Let us take the function $y_a$ defined by $y_a = D * x_\alpha$, with $x_a = (2a)^{1/4} e^{-\pi a t^2}$, and D being a distribution having the form $$D(u) = \sum_k a_k \delta(u - k\sqrt{2})$$

$$\frac{\sum_k |y_\alpha(u - k/\sqrt{2})|^2}{\|y_\alpha\|^2} = \frac{\sum_k |x_\alpha(u - k/\sqrt{2})|^2}{\|x_\alpha\|^2}$$

3.3.5. Commutative nature of the operators O and $F^{-1}OF$

We shall now show that the operators O and $F^{-1}OF$. switch over when they are applied to a Gaussian function. Let $x_\alpha = (2\alpha)^{1/4} e^{-\pi\alpha t^2}$.

Then $FX = x_{1/\alpha}$ and $Ox_a = P_a x_a$ $P_a$ being defined by the relationship:

$$P_\alpha(u) = \frac{2^{1/4}}{\sqrt{\sum_k |x_\alpha(u - k/\sqrt{2})|^2}}$$

and its Fourier transform $D_a$ by:

$$D_\alpha(u) = \sum_k a_{\alpha,k} \delta(u - k/\sqrt{2})$$

Let $y_a = F^{-1} OF x_a$ and $z_a = Oy_a$. It is possible to write:

$$y_a = F^{-1} OF x_a = F^{-1} O x_{1/\alpha} = F^{-1}(P_{1/\alpha} x_{1/\alpha}) = D_{1/\alpha} * x_a$$

and $$z_\alpha(u) = \frac{2^{1/4} y_\alpha(u)}{\sqrt{\sum_k |y_\alpha(u - k/\sqrt{2})|^2}}$$

Since $x_a$ and $y_a$ having a norm equal to unity, it is possible to write, by applying lemma 2:

$$z_\alpha(u) = \frac{2^{1/4} y_\alpha(u)}{\sqrt{\sum_k |x_\alpha(u - k/\sqrt{2})|^2}} = P_\alpha y_\alpha = P_\alpha(D_{1/\alpha} * x_\alpha)$$

In the same way, the following is defined:

$$w_{1/a} = FOx_a = F(P_a x_a) = D_a * x_{1/a}$$

It is possible to write:

$$Ow_{1/a}(u) = \frac{2^{1/4} w_{1/a}(u)}{\sqrt{\sum_k |w_{1/a}(u - k/\sqrt{2})|^2}}$$

Since $x_{1/a}$ and $w_{1/a}$ have a norm equal to unity, we have, in application of the lemma 2:

$$Ow_{1/a}(u) = \frac{2^{1/4} w_{1/a}(u)}{\sqrt{\sum_k |x_{1/a}(u - k/\sqrt{2})|^2}} = P_{1/a} w_{1/a} = P_{1/a}(D_a * x_{1/a})$$

Giving, by reverse Fourier transform:

$$F^{-1} OFOx_a = F^{-1} Ow_{1/a} = D_{1/a} * (P_a x_a)$$

Now, by application of the lemma 1:

$$D_{1/a} * (P_a x_a) = P_a (D_{1/a} * x_a)$$

It is deduced therefrom that:

$$OF^{-1} OFx_a = F^{-1} OFOx_a$$

Theorem 3
For any Gaussian function x, the operators O and $F^{-1}OF$ switch over, giving:

$$OF^{-1} OFx = F^{-1} OFOx$$

Corollary 1
Let $z_a = OF^{-1} OFx_a$, with $x_o = (2a)^{1/4} e^{-\pi a 1^2}$, then $Fz_a = z_{1/a}$.
Demonstration:

$$Fz_a = FF^{-1} OFOx_a = OF^{-1} OX_a = OF^{-1} OFx_{1/a} = z_{1/a}$$

Noteworthy particular case $$Fz_1 = z_1$$

This particular function gives perfect symmetry to the time and frequency axes and therefore constitutes the prototype function of the IOTA transform (Isotropic Orthogonal Transform Algorithm). This particular function $\Im$ will be noted.

Corollary 2
Let x be a Gaussian function and $z = OF^{-1} OFx$, then $Oz = z$.
Demonstration:

$$OZ = OOF^{-1} OFx = OF^{-1} OFx = z$$

Corollary 3
Let x be a Gaussian function and et $z = OF^{-1} OFx$, then $F^{-1} OFz = z$.
Demonstration:

$$F^{-1} OFz = F^{-1} OFF^{-1} OFOx = F^{-1} OOFOx = F^{-1} OFOx = z$$

3.3.6. Ambiguity function of the functions z.
Let us consider the theorem 2, with the normalization $\tau_0 = \nu_0 = 1/\sqrt{2}$. Then:

$$O_f = {}^\Delta O \text{ and } O_t = F^{-1} OF$$

Consequently, the theorem 2 can be rewritten:
Theorem 4
Let x be a Gaussian function and $z = F^{-1} OFOx$, then:

$$\forall (m,n) \neq (0,0), A_z(n\sqrt{2}, m\sqrt{2}) = 0$$

4. Appendix
Let us take a normalized Gaussian function $x_a$ defined by:

$$x_a(u) = (2a)^{1/4} e^{-\pi a 1^2}$$

The product $x_a(u-a) x_a(u-b)$ can therefore be written:

$$x(u-a) x(u-b) = \sqrt{2a} e^{-\pi a ((u-a)^2 + (u-b)^2)}$$

Now we have the identity:

$$(u-a)^2 + (u-b)^2 = 2\left[\left(u - \frac{a+b}{2}\right)^2 + \left(\frac{a-b}{2}\right)^2\right]$$

Finally, it is possible to write:

$$x(u-a) x(u-b) = e^{-\pi (\alpha(a-b))^2/2} \left[x\left(u - \left(\frac{a+b}{2}\right)\right)\right]^2$$

What is claimed is:
1. Multicarrier signal designed to be transmitted in a transmission channel to digital receivers, the signal corresponding to the frequency multiplexing of several elementary carriers extending in temporal and frequency domains, each carrier corresponding to a series of symbols, two consecutive symbols being separated by a symbol time $\tau_0$, characterized in that, firstly, the spacing $\nu_0$ between two neighboring carriers is equal to half of the reverse of the symbol time $\tau_0$,
   and in that, secondly, each carrier has a spectrum with a filtered shape having a bandwidth strictly greater than twice said spacing between carriers $\nu_0$ and each symbol element being concentrated in temporal and frequency domains.
2. Signal according to claim 1, characterized in that its complex envelope responds to the following equation:

$$s(t) = \sum_{m,n} a_{m,n} x_{m,n}(t)$$

where:
   $a_{m,n}$ is a real coefficient chosen out of a predetermined alphabet of modulation;
   m is an integer representing the frequency dimension;
   n is an integer representing the temporal dimension;
   t represents time;
   $x_{m,n}(t)$ is a basic function translated into the time-frequency space of one and the same even-order prototype function x(t) taking real or complex values, namely:

$$x_{m,n}(t) = \pm i^{m+n} e^{i(2\pi m \nu_0 t + \phi)} x(t - n\tau_0) \text{ with } \nu_0 \tau_0 = \frac{1}{2}$$

where $\phi$ is an arbitrary phase parameter,
   the Fourier transform X(f) of the function x(t) having a support extending beyond the interval $[-\nu_0, \nu_0]$,
   and where said basic functions $\{x_{m,n}\}$ are mutually orthogonal, the real part of the scalar product of two different basic functions being zero.

3. Signal according to claim 2, characterized in that said prototype function x(t) is an even-order function that is zero outside the interval $[-\tau_0, \tau_0]$, and verifies the relationship:

$$\begin{cases} x(t) = 0 & \text{if } |t| \geq \tau_0 \\ |x(t)|^2 + |x(t-\tau_0)|^2 = 1/\tau_0 & \text{if } 0 \leq t < \tau_0. \end{cases}$$

4. Signal according to claim 3, characterized in that said prototype function x(t) is defined by:

$$x(t) = \begin{cases} \frac{1}{\sqrt{\tau_0}} \cos \pi t / 2\tau_0 & \text{if } |t| \leq \tau_0 \\ 0 & \text{elsewhere.} \end{cases}$$

5. Signal according to claim 2, characterized in that said prototype function x(t) is characterized by the equation:

$$x(t) = \frac{y(t)}{\sqrt{\tau_0 \sum_k |y(t-k\tau_0)|^2}}$$

the function y(t) being defined by its Fourier transform Y(f):

$$Y(f) = \frac{G(f)}{\sqrt{v_0 \sum_k |G(f - kv_0)|^2}}$$

where G(f) is a normalized Gaussian function of the type: $G(f) = (2a)^{1/4} e^{-\pi a f^2}$, a being a strictly positive real parameter.

6. Signal according to claim 5, characterized in that the parameter a is equal to unity.

7. Method for the transmission, of a digital signal especially in a non-stationary transmission channel, characterized in that it comprises the following steps:

channel encoding a digital signal to be transmitted, delivering real digital coefficients $a_{m,n}$ chosen out of a predetermined alphabet;

constructing a signal a(t) complying with the following equation:

$$s(t) = \Sigma a_{m,n} x_{m,n}(t)$$

where:
m is an integer representing frequency dimension;
n is an integer representing temporal dimension;
t represents time;
$x_{m,n}(t)$ is a basic flnction translated into the time-frequency space of one and the same even-order prototype function x(t) taking real or complex values, namely:

$$xm,n(t) = \pm i^{m+n} e^{i(2\pi t s v_0 + \phi)} x(t - n\tau_0) \text{ with } v_0 \tau_0 = \frac{1}{2}$$

where $\phi$ is an arbitrary phase parameter,
the Fourier transform X(f) of the function x(t) having a support extending beyond the interval $(-v_0, v_0)$,
said basic functions $\{x_{m,n}\}$ being mutually orthogonal, the real part of the scalar product of two different basic functions being zero; and
transmitting a signal, having said signal s(t) as its complex envelope, to at least one receiver.

8. Method according to claim 7, characterized in that it comprises a step of frequency and/or time interlacing applied to the binary elements forming said digital signal to be transmitted or to the digital coefficients $a_{m,n}$ coming from the channel encoding.

9. Method for the reception of a signal corresponding to the frequency multiplexing of several elementary carriers extending in temporal and frequency domains, each carrier corresponding to a series of symbols, two consecutive symbols being separated by a symbol time $\tau_0$, the spacing $v_0$ between two neighboring carriers being equal to half of the reverse of the smbol time $\tau_0$, and each carrier having a spectrum with a filtered shape having a bandwidth strictly greater than twice the spacing between carriers $v_0$ and each symbol element being concentrated in temporal and frequency domains, characterized in that the method comprises the following steps:

receiving the signal having, as its complex envelope, a signal r(t);

estimating the response of the transmission channel comprising an estimation of the phase response $\theta_{m,n}$ and of the amplitude response $\rho_{m,n}$;

demodulating said signal r(t) comprising the following steps:

multiplying said signal r(t) by the prototype function x(t);

aliasing the filtered waveform modulo $2\tau_0$;

applying a Fourier transform (FFT);

correcting the phase $\theta_{m,n}$ induced by the transmission channel;

correcting the phase corresponding to the term $i^{m+n}$;

selecting the real part of the coefficient obtained $\tilde{a}_{m,n}$ corresponding to the coefficient $a_{m,n}$ transmitted weighted by the amplitude response $\rho_{m,n}$ of the transmission channel.

10. Method according to claim 9, characterized in that it comprises a step for the frequency and/or time de-interlacing of said real digital coefficients $\tilde{a}_{m,n}$ and, possibly, of the corresponding values $\rho_{m,n}$ of the amplitude response of the channel, said de-interlacing being symmetrical to an interlacing implemented at transmission and/or a step of weighted-decision decoding that is adapted to the channel encoding implemented at transmission.

11. Method for the construction of a prototype function x(t) for a signal, corresponding to the frequency multiplexing of several elementary carriers extending in temporal and frequency domains, each carrier corresponding to a series of symbols, two consecutive symbols being separated by a symbol time $\tau_0$, the spacing $v_0$ between two neighboring carriers is equal to half of the reverse of the smbol time $\tau_0$, and each carrier having a spectrum with a filtered shape having a bandwidth strictly greater than twice the spacing between carriers vo and each symbol element being concentrated in temporal and frequency domains, the signal having a complex envelope responds to the following equation:

$$s(t) = \sum_{m,n} \alpha_{m,n} x_{m,n}(t);$$

where:

$a_{-m,n}$ is a real coefficient chosen out of a predetermined alphabet of modulation;

m is an integer representing the frequency dimension;

n is an integer representing the temporal dimension;

t represents time;

$x_{-m,n}(t)$ is a basic function translated into the time-frequency space of one and the same even-order prototype function x(t) taking real or complex values, namely:

$$x_{-m,n}(t) = \pm i^{m+n} e^{i(2\pi r i \nu_0 r t \phi)} x(t - n\tau_0) \text{ with } \nu_0 \tau_0 = \tfrac{1}{2}$$

where $\phi$ is an arbitrary phase parameter the Fourier transform X(f) of the function x(t) having a support extending beyond the interval $[-\nu_0, \nu_0]$, and where said basic functions $\{x_{m,n}\}$ are mutually orthogonal, the real part of the scalar product of two different basic functions being zero;

and further characterized in that the method comprises the following steps:

selecting a normalized Gaussian function G(f) of the type:

$$G(f) = (2a)^{1/4} e^{\pi g^2};$$

determining said prototype function x(t) such that:

$$x(t) = \frac{y(t)}{\sqrt{t_0 \sum_k |(y(t - k\tau_0))^2|}}$$

the function y(t) being defined by its Fourier transform Y(f):

$$Y(f) = \frac{G(f)}{\sqrt{\nu_0 \sum_k |G(f - k\nu_0)|^2}}$$

12. Method for the modulating of a multicarrier signal designed to be transmitted in a transmission channel to digital receivers, comprising: frequency multiplexing several elementary carriers extending in temporal and frequency domains, each corresponding to a series of symbols, two consecutive symbols being separated by a symbol time $\tau_0$, such that the spacing $\nu_0$ between two neighboring carriers is equal to half of the reverse of the symbol time $\tau_0$, and filtering each carrier for the shaping of its spectrum having a bandwidth strictly greater than twice said spacing between carriers $\nu_0$ and concentrating each symbol element as far as possible in temporal and frequency domains.

* * * * *

UNITED STATES PATENT AND TRADEMARK OFFICE
CERTIFICATE OF CORRECTION

PATENT NO.      : 6,278,686 B1
DATED           : August 21, 2001
INVENTOR(S)     : Michel Alard It is certified that error appears in the above-identified patent and that said Letters Patent is hereby corrected as shown below:

Column 1,
Line 43, delete "of.", insert -- of --

Column 2,
Line 3, delete "limiteband", insert -- limitedband --
Line 59, delete "EProtection", insert -- Protection --

Column 3,
Line 46, delete "$2\pi nv_0 t$", insert -- $2\pi mv_0 t$ --

Column 6,
Line 49, delete "t", insert -- $\xi$ --

Column 8,
Line 17, delete "2 Hm $v_0$r", insert -- $2\pi mv_0 t$ --

Column 9,
Line 13, delete "$[\tau_0,\tau_0]$", insert -- $[-\tau_0,\tau_0]$ --
Line 19, delete "difined", insert -- defined --
Line 48, delete "$(2a)^{1/4} e^{-vof^2}$", insert -- $(2\alpha)^{1/4} e^{-\pi\alpha f^2}$ --

Column 10,
Line 22, delete "$2\tau_0$; ;", insert -- $2\tau_0$; --
Line 46, delete "$2a\alpha)$", insert -- $2(\alpha)$ --

Column 11,
Line 63, delete "n-n')", insert -- (n-n') --

Column 12,
Line 12, delete "$X_{m',m'}$", insert -- $X_{m',n'}$ --
Line 16, delete "$4i,ymv_0 t$", insert -- $4\pi mv_0 t$ --
Line 25, delete "$e^{-2i\pi a}$", insert -- $e^{-2i\pi vt}$ --
Line 36, delete "$\{2mv_0 2n\tau_0\}$", insert -- $\{2mv_0 2n\tau_0\}$ --

UNITED STATES PATENT AND TRADEMARK OFFICE
CERTIFICATE OF CORRECTION

PATENT NO. : 6,278,686 B1
DATED : August 21, 2001
INVENTOR(S) : Michel Alard

It is certified that error appears in the above-identified patent and that said Letters Patent is hereby corrected as shown below:

<u>Column 13,</u>
Line 15, delete "$\dfrac{1}{v_0}$", insert -- $\dfrac{1}{\sqrt{v_0}}$ --

Line 55, delete "$2i\pi nv_0\tau$", insert -- $2i\pi mv_0\tau$ --

<u>Column 16,</u>
Line 2, delete "$2i\pi nv_0 t$", insert -- $2i\pi mv_0 t$ --

<u>Column 19,</u>
Line 37, delete "dvdtOr", insert -- dvdt Or --

<u>Column 20,</u>
Line 29, delete "$â_n$", insert -- $â_m$ --

Line 29, delete "x*$_n$*(t)" insert -- $x_n^*(t)$ --

Line 35, delete "$k_n$*(t)", insert -- $x_n^*(t)$ --

Line 42, delete "$\varphi_x$", insert -- $\varphi_k$ --
Line 42, delete "v*$\mu_k$-v$_n$", insert -- v+v$_k$-v$_n$ --
Line 42, delete "$\tau$*$\tau_k$+$\pi_n$", insert -- $\tau$+$\tau_k$+$\tau_n$ --
Line 47, delete "v*v$_k$-v$_n$", insert -- v+v$_k$-v$_n$ --
Line 47, delete "$\tau$*$\tau_k$+$\tau_n$", insert -- $\tau$+$\tau_k$+$\tau_n$ --

<u>Column 21,</u>
Line 10, delete "($\theta$-$\varphi$)", insert -- ($\varphi$-$\theta$) --
Line 48, delete "xn", insert -- x$_n$ --

Line 50, delete "Axn", insert -- $A_{x_n}$ --

Line 54, delete "$2iv_n+\tau_n v$", insert -- $2i\pi(v_n+\tau_n v)$ --
Line 65, after "]", insert -- ) --

UNITED STATES PATENT AND TRADEMARK OFFICE
CERTIFICATE OF CORRECTION

PATENT NO. : 6,278,686 B1
DATED : August 21, 2001
INVENTOR(S) : Michel Alard

It is certified that error appears in the above-identified patent and that said Letters Patent is hereby corrected as shown below:

Column 23,
Line 16, after "]", insert -- ) --
Line 20, after "$\Delta t^2 dv^2$", insert -- + --

Line 25, delete "$z = \sqrt{4\pi^{2(\Delta t^{2v^2} + \Delta f^2 \tau^2) - 2\mu v \tau}}$", insert -- $z = \sqrt{4\pi^{2(\Delta t^2 v^2 + \Delta f^2 \tau^2) - 2\mu v \tau}}$ --

Column 24,
Line 65, delete "$2ixf\tau$", insert -- $2i\pi f\tau$ --
Line 67, delete "$\sigma$", insert -- $\tau$ --

Column 25,
Line 8, delete "$-2i\pi x$", insert -- $-2i\pi vt$ --
Line 10, delete "$-\rho_k$", insert -- $-i\varphi_k$ --
Line 12, delete "$-2i\pi x$", insert -- $-2i\pi vt$ --
Line 16, delete "$vf_k$" insert -- $v\tau_k$ --
Line 16, delete "$-2i\pi\mu$»", insert -- $-2i\pi vu$ --
Line 16, delete "$x(\mu+\tau/2)x*(\mu-\tau/2)du$" insert -- $x(u+\tau/2)x*(u-\tau/2)du$ --
Line 16, delete "$(\mu_k+\pi_k)$", insert -- $v_k+v\tau_k$ --
Line 23, delete "$\rho_k$", insert -- $\varphi_{k'}$ --
Line 23, delete "$\rho_k$", insert -- $v_k$ --
Line 28, delete "$(\rho_k-\rho_k)$", insert -- $(\varphi_k-\varphi_{k'})$ --
Line 32, delete "$(\rho_k-\rho_k)$", insert -- $(\varphi_k-\varphi_{k'})$ --
Line 33, delete "$x(\mu$", insert -- $x(u$ --
Line 33, "$x*(\mu-\tau_k$", insert -- $x*(u-\tau_{k'}$ --
Line 35, delete "$2in$", insert -- $2i\pi$ --
Line 35, delete "$(\tau_k+\tau_k)$", insert -- $(\tau_k+\tau_{k'})$ --
Line 35, delete "$v_k-v_k$", insert -- $v_{k'}-v_k$ --
Line 40, delete "$2ifmv_0t$", insert -- $2i\pi mc_0t$ --
Line 52, delete "$(n+n'))$", insert -- $(m-m')(n+n'))$ --
Line 58, delete "modulo2", insert -- modulo 2 --

Column 27,
Line 26, delete "ahd y", insert -- $A_y$ --
Line 43, delete "$4i\mu t$", insert -- $4i\pi v_0 t$ --

Column 28,
Line 67, delete "$-\pi_2$", insert -- $-\pi\alpha t^2$ --

UNITED STATES PATENT AND TRADEMARK OFFICE
CERTIFICATE OF CORRECTION

PATENT NO.    : 6,278,686 B1
DATED         : August 21, 2001
INVENTOR(S)   : Michel Alard It is certified that error appears in the above-identified patent and that said Letters Patent is hereby corrected as shown below:

Column 29,
Line 29, delete "-π(α", insert -- -πα --
Line 37, delete "-π(α", insert -- -πα --

Column 30,
Line 3, delete "$|y_a|^2$", insert -- $\|y_\alpha\|^2$ --
Line 3, delete "$c|x_a|^2$", insert -- $c\|x\alpha\|^2$ --
Line 15, delete "2a", insert -- 2α --

Column 31,
Line 39, delete "$x_\sigma = (2a)^{1/4} e^{-\pi a 1^2}$", insert -- $x_\alpha = (2\alpha)^{1/4} e^{-\pi \alpha t^2}$ --

Line 67, delete "ΔO", insert -- O --

Column 32,
Line 10, delete "$x_a(u) = (2a)^{1/4} e^{-\pi a 1^2}$", insert -- $x_\alpha(u) = (2\alpha)^{1/4} e^{-\pi \alpha t^2}$ --

Line 23, delete "-π(α(a-b))²", insert -- -πα(a-b)² --
Line 60, delete "$2\pi m v_0 r$", insert -- $2\pi m v_0 t$ --
Line 64, delete "$[-v_0 v_0]$", insert -- $[-v_0, v_0]$ --

Column 33,
Line 33, delete "$2a^{1/4} e^{-\pi a^{-2}}$, a", insert -- $2\alpha^{1/4} e^{-\pi \alpha f^2}$, α --

Line 36, delete "a", insert -- α --
Line 52, delete "flnction", insert -- function --
Line 57, delete "$2\pi \tau s v_0$", insert -- $2\pi m v_0 t$ --

UNITED STATES PATENT AND TRADEMARK OFFICE
CERTIFICATE OF CORRECTION

PATENT NO. : 6,278,686 B1
DATED : August 21, 2001
INVENTOR(S) : Michel Alard

It is certified that error appears in the above-identified patent and that said Letters Patent is hereby corrected as shown below:

Column 35,
Line 2, delete "$a_{-m,n}$", insert -- $\alpha_{m,n}$ --
Line 9, delete "$x_{-m,n}$", insert -- $x_{m,n}$ --
Line 9, delete "fimction", insert -- function --
Line 11, delete "finction", insert -- function --
Line 14, delete "$i(2\varPi riv_0 rt\varphi)$", insert -- $i(2\pi m v_0 t + \varphi)$ --
Line 19, delete "ofthe", insert -- of the --
Line 30, delete "$(2a)^{1/4} e^{\pi g^2}$", insert -- $(2\alpha)^{1/4} e^{-\pi\alpha f^2}$ --

Signed and Sealed this

Eighth Day of October, 2002

Attest:

JAMES E. ROGAN
Attesting Officer
Director of the United States Patent and Trademark Office

UNITED STATES PATENT AND TRADEMARK OFFICE
CERTIFICATE OF CORRECTION

PATENT NO. : 6,278,686 B1  
DATED : August 21, 2001  
INVENTOR(S) : Michel Alard It is certified that error appears in the above-identified patent and that said Letters Patent is hereby corrected as shown below:

<u>Title page,</u>
Insert -- [73] Assignee: France Telecom, Societe Civile Michel Alard and Telediffusion De France --

Signed and Sealed this

Third Day of June, 2003

JAMES E. ROGAN
*Director of the United States Patent and Trademark Office*